United States Patent

[11] 3,599,040

[72] Inventor Gerard Ebersohl
Aix-Les-Bains, France

[21] Appl. No. 874,182
[22] Filed Nov. 5, 1969
[45] Patented Aug. 10, 1971
[73] Assignee Compagnie Generale D'Electricite
Paris, France
[32] Priority Nov. 5, 1968
[33] France
[31] 172630

[54] ON-LOAD ELECTRONIC CONTROL SYNCHRONOUS SWITCHING DEVICE
16 Claims, 46 Drawing Figs.

[52] U.S. Cl. .... 317/11, 307/133, 307/207, 317/33, 317/43, 321/14, 323/43.5
[51] Int. Cl. .... H02h 7/22
[50] Field of Search .... 317/31, 33, 11, 43; 321/13, 14, 5; 307/133, 207; 323/43.5, 43.5 S

[56] References Cited

UNITED STATES PATENTS

| | | | |
|---|---|---|---|
| 3,263,157 | 7/1966 | Klein | 323/43.5 X |
| 3,351,838 | 11/1967 | Hunter | 321/5 |
| 3,423,635 | 1/1969 | Moe | 317/33 X |
| 3,523,240 | 8/1970 | Bouvier | 323/43.5 |

*Primary Examiner*—James D. Trammell
*Attorney*—Sughrue, Rothwell, Mion, Zinn and Macpeak

ABSTRACT: Logical circuit for controlling switching from one terminal to another on a power transformer supplying a very distorted current and comprising a mechanical preselector and two solid-state switches, whose effect is to permit the shutting off of a first switch (A) and the priming of a second switch (B) only if the operation can be effected without danger to the equipment, depending on the form of the current during the operation.

| | (A) I | (B) II | (A) III | (B) IV | (A,B) V |
|---|---|---|---|---|---|
| (1) | 1 | 0 | 1 | 0 | A |
| (2) | 1 | 1 | 0 | 0 | 0 |
| (3) | 1 | 1 | 0 | 0 | B |
| (4) | 0 | 1 | 0 | 1 | B |

DETECTOR OF PASSAGE OF LOAD CURRENT THROUGH ZERO

DETECTOR OF LOAD CURRENT REACHING ZERO
WITHOUT CHANGE OF SIGN

| a | b | c | d |
|---|---|---|---|
| 1 | 1 | 1 | 1 |

| a | b | c | d |
|---|---|---|---|
| 1 | 1 | 1 | 1 |

| a | b | c | d |
|---|---|---|---|
| 1 | 0 | 1 | 0 |

GENERATOR OF START OF SEQUENCE, EXTINCTION, AND STEERING SIGNALS.

GENERATOR OF FIRING SIGNAL

LOGIC CONTROL CIRCUIT

MECHANICAL PRESELECTOR CONTROL AND BLOCKING CIRCUIT

ON-LOAD ELECTRONIC CONTROL SYNCHRONOUS SWITCHING DEVICE

BACKGROUND OF THE INVENTION

1. Field of the Invention

The invention concerns an on-load electronic control synchronous switching device for a transformer having multiple tappings to switch from one tapping to another and the device comprises, a mechanical preselector and two solid-state static switches. The device is intended more particularly for use where the current flowing in the load shows considerable and rapidly variable alterations relative to the ideal sinusoidal form.

By synchronous switching is meant that the disconnection of one tapping and the connection of the next tapping take place practically at the same time.

2. Description of Prior Art

In certain industrial applications, the current delivered to the load is not even approximately sinusoidal; in a single-phase traction substation, in particular, the current delivered by the transformer is generally no longer sinusoidal, especially if the section of overhead wire is being used by controlled rectifier locomotives. Oscillograms show that in this case, due to multiple variations in the load, the current may assume an almost random form.

On the other hand, it is known, particularly through the Applicants' French Pats. No. 1,514,361 "On-load switching device" and No. 1,522,557 "On-load switching device with preselector," to apply to two pairs of thyristors functioning as switches in correlation with a mechanical tapping preselector, a series of commands succeeding each other in a predetermined order, and leading in complete safety from the starting situation (engagement on tapping No. $n$) to the final situation (engagement on tapping No. $n+1$).

Since such switching is generally operated at a high power level (for example, several thousands of kilowatts) and involves expensive equipment, it is absolutely essential that switching, made necessary by the frequent variations in working conditions, particularly in traction, should be possible without endangering the transformer or accessory equipment.

The principal dangers which threaten the installation are the following:

Simultaneous closure of the two solid-state switches in series respectively with two adjacent tappings, whose interval defines a voltage correction step. The result is a "step short-circuit," resulting in the destruction of the transformer.

Excessively lengthy passage of the load current to the protection elements which are solid-state circuit elements provided for carrying the load current during a very short interval in which the two solid-state switches are open (in fact the load current should not be interrupted at any moment). This interval, does not normally exceed a few hundred microseconds. If the two solid-state switches remain open for several milliseconds or more, the protection elements are incapable of absorbing such an amount of energy and are destroyed.

With known devices, particularly those devices disclosed in the foregoing French patents, this problem may be solved for a load current having an approximately sinusoidal form and a switching order given under well-defined conditions and selected by a logical circuit as presenting the most favorable situation for initiating a switching process. The successive operations may occur according to the preestablished order, which order is based on a current having approximately sinusoidal form.

If, however, the load current has such considerable distortions such that it assumes an almost random form, safety measures must be taken for preventing the accomplishment of a switching operation which, having started under favorable conditions, is then confronted by conditions prohibited as a result of the instantaneous, violent and unforeseeable variations in the load current.

SUMMARY OF THE INVENTION

As recalled in the foregoing, the installation to be controlled by the logical device of the present invention substantially comprises two solid-state switches, each of which has at least two thyristors connected top to bottom to allow the two current alternations to pass.

In the working condition, these two solid-state switches are not in service; one, denoted by A, in series with the engaged tapping (tapping $n$) is shunted by a metal short circuit formed by one of the elements of the preselector, such that during the stationary intervals separating the changes in tapping, only a negligible current passes through the switch A. The other switch, denoted by B, is in series with a contact adapted to engage the next tapping (tapping $n\pm1$), but remains disconnected from this tapping in the working state.

In the disclosure which follows, there is complete symmetry between switching from B to A and switching from A to B, the following is an example.

The preselector has a twofold function:

a. It carries out the mechanical actions, engagement-break, closing-opening of the short circuit for A and B.

b. It delivers "gate current" application orders for A or B; the equipment comprises at least one DC generator, whose current, when injected into the "gate" circuit of a thyristor ("-gate current"), renders it conducting.

In fact, it is known that if the current passing through a thyristor passes through zero, this thyristor becomes nonconducting. When there arises another alternation of the same polarity, preparing to pass through the same thyristor, this passage is is possible only if the thyristor is reprimed by the injection of a gate current applied to its "gate" or "trigger." In the absence of such a current, engaged by a priming pulse, the thyristor remains blocked even in the presence of a voltage applied to its terminals in the current-passing direction.

Consequently, the switch A, in the operative state, continuously receives direct gate current and the switch A is therefore ready at any moment to transit the load current (which, however, it does not do effectively in the working state, since it is short-circuited). The switch B, in the operative state, receives no gate current. On the other hand, at the end of the switching operation, the situation is reversed: the switch A, which was blocked, no longer receives gate current, and the switch B receives gate current.

It is the preselector which presides over this redistribution of the functions and in addition to its contact opening-closing action, it supplies the following orders; "application of priming pulses to the gate current circuit of A" or "application of priming pulses to the gate current circuit of B," according to the progress of the switching process. These orders may be emitted, for example, by the excitation of phototransistors by beams of light. For this purpose, the preselector is provided with a diaphragm device whereby it is possible to stop or transmit two beams of light; when one beam of light reaches the corresponding phototransistor through an aperture of the diaphragm, the switch A receives initiation pulses; when a second beam of light reaches its corresponding phototransistor through another aperture of the diaphragm, the switch B receives initiation or priming pulses.

The following operations are therefore accomplished in the course of a switching operation:

1. Initial position. A is connected galvanically to the tapping $n$; A is in short circuit; and A receives gate current. B is disconnected from the tapping $n\pm1$; B is not in short circuit; and B does not receive gate current.

2. A is connected galvanically to the tapping $n$; A is de-short-circuited; and A no longer receives gate current. B is connected galvanically to the tapping $n\pm1$; B is not shunted by its short circuit; and B does not receive gate current.

3. A is connected galvanically to the tapping $n$; A is de-short-circuited; and A does not receive gate current. B is connected galvanically to the tapping $n\pm1$; B is still not short-circuited; and B receives gate current.

4. A is disconnected from the tapping $n$; A is de-short-circuited; and A does not receive gate current. B is connected galvanically to the tapping $n\pm1$; B is short-circuited; and B receives gate current. This is the final position; the functions of A and B have been transposed.

At stages 2 and 3, the two switches are connected to their respective tapping. At stage 2, no initiating pulse generator of switch B commences to receive illumination.

Up to stage 2 inclusive, the initial tapping $n$ is under load and the load current, which passed initially through the short circuit of the switch A, now passes through the switch A. This situation still persists at the commencement of stage 3; and it is during the passage from stage 3 to stage 4 that transfer will take place of the load from switch A, which is going to open, to the switch B, which is going to close in synchronism, thus putting the tapping $n\pm1$ under load, while the tapping $n$ is relieved of the load. During a short transition instant the two switches are open and the load current therefore passes to the "protection elements" (Zener effect diodes).

This transfer, which may be operated on the basis of the passage of a program, stored once and for all, when the waveform of the current is correct and which has to be supervised step-by-step if the waveform of the current is likely to produce damage to the installation in the course of the transfer.

It is possible that at the instant provided for closing the switch B, the instantaneous form of the current is such that the switch A, which has just opened, closes; if B is also closed, a step short circuit, as previously referred to is produced.

It is also possible for the form of the current to be such that upon the switch A opening, closure of B must be delayed by a time exceeding the resistance capacity of the protection elements. In such a case, it is necessary to stop the sequence and return to the initial point, if not, the protection elements will be destroyed.

Finally, it is possible for the form of the current to be such as to authorize switching, but safety instructions applied too strictly by the logical circuit prevent the transfer from being accomplished effectively.

The control device according to the invention is more particularly characterized in that the logical control circuit comprises a store for the order of the commencement of a sequence, a store for the order of extinction of the controlled rectifiers, and a store for the routing of the order of ignition of the controlled rectifiers. This latter store comprising two complementary outputs, each connected to an AND circuit controlling the ignition of one of the static switches. Each of these AND circuits furthermore receives an ignition signal, due to the fact that the time separating the extinction order from the sequence commencement order is at least equal to the time at the end of which, after passage of the minimum load current through zero, the static switches can no longer be extinguished if their control current is suppressed. This is due to the fact that the routing signal is distinct from the extinction signal and is emitted after the latter, and also due to the fact that the ignition signal, after the passage of the load current through zero, is produced only at the end of a time longer than the deionization time of the controlled rectifiers.

Another characteristic of the device according to the invention is that it comprises a device for cyclically supplying the different command signals.

The logical circuit which has to carry out the above-mentioned instructions, is constructed on the following principles:

Once the thyristors of switch A are de-short-circuited and the thyristors of switch B are connected to the appropriate tapping of the transformer, the switching order is transmitted to the logical circuit by means of a beam of light uncovered by the rotary diaphragm associated with the preselector. This beam acts on a phototransistor associated with the circuit B, called phototransistor B (the phototransistor associated with the circuit A being then in the dark), which is associated with an element giving the logical level 1 to the illumination.

The switching order is prepared as soon as the phototransistor B is illuminated; this instant is denoted by $t_0$.

The switching order is recorded in a store on the arrival of an instant, called the first instant $t_1$ following $t_0$. The definition of the instant $t_1$ will be given later.

For reasons which will appear later, a tentative switching operation requires 2 ms. for its preparation, starting from the instant called $t_1$.

The time lapse of 2 ms. is produced by a monostable trigger circuit, which requires a certain recovery time to function correctly, as is known, and a delay of 1 ms. is provided as a recovery time. If we take the general case, in which the sequence reiterator has had to trigger a number of sequences which have failed before an instantaneous situation is obtained authorizing the switching operation, under these conditions, for any constant $t$ to be taken for $t_1(j+1)$, commencement of a $(j+1)$th switching tentative following the $j$th, it is necessary:

1. That at the instant $t$, the load current $I(t)$ has an algebraic value called $I_+$regardless of the value of $I(t+\epsilon)$, *even if $\epsilon$ tends to zero, and*

2. That $t$ is separated from $t_1(j)$ by 3 ms., i.e. 2 ms. operational duration, plus 1 ms. recovery time.

Since the time $t_1$ may coincide with a zero of $I_1$ we are obliged systematically to wait at least 1 ms. after $t_1$ to give the order of suppression of the gate current in the switch A to ensure that on the extinction of the gate current in A, the current passed by A is larger than the minimum maintenance current, because A should not be extinguished at this moment.

To avoid ambiguities of decision, which could be produced for certain forms of current, the suppression of the gate current of A and the preparation for ignition of B are separated into two distinct times; for reasons of convenience, the interval of separation has been fixed at 1 ms. This additional interval did not exist in the switching sequence described in French Pat. No. 1,514,361.

When, for any reason due to the form of the current $I(t)$ switching cannot be effected, the sequential logical circuit should be able to make all the arrangements so that the switch A, initially under load, never remains open for more than 270 $\mu$ s.; this duration of 270 $\mu$ s. has been adopted as the admissible maximum for the passage of the load current by the protection elements (Zener effect diodes), which would be destroyed if they were subjected to a longer stress. This duration of 270 $\mu$ s. is slightly longer than the minimum deionization time, assumed to be equal to 200 $\mu$ s.

On the other hand, switch B should not, under any circumstances, receive the ignition order, however fugitive, while switch A is ignited, otherwise a step short circuit will be produced. The sequential logical device should be designed so that, even if an anomaly arises at the last microsecond of switching, this safety criterion is observed.

The logical circuit comprises a certain number of stores. It is quite evident that for any law $I(t)$, certain anomalies may fall into synchronism with characteristic instants of the sequence, such that the stores may be acted on by simultaneous and contradictory orders. In such a case, the state of the store becomes random, which must not be tolerated.

Steps must be taken so that:

1. After the appearance of such a synchronism, the store is immediately positioned in the desired state, and 2. The above-mentioned cases of synchronism ought, on no account, generate orders other than the reignition of A as rapidly as possible, and repositioning of all the circuits in the corresponding state.

If a defect occurs in the course of the preparatory sequence, that is to say, between $t_1$ and $t_1+2$ ms., A is returned to load, the sequence is stopped, and the defect is stored in an anomaly store.

It will be possible to recommence a fresh attempt only on the appearance of a fresh instant $t_1$, the first effect of which appearance will be to return all these stores to zero.

Under these conditions, if several defects, whether different or not, appear consecutively in the interval $t_1-t_1+2$ ms., the first defect found returns A to load and interrupts the sequence.

This mode of operation renders the logical circuit independent of the rate of appearance of the defects compared with its own rate of operation, since the defects will have to be treated only every 3 milliseconds at the closest.

The foregoing remarks apply equally well if a defect occurs either in the interval ($t_2$–$t_2$+270 $\mu$ s.)

or in the interval ($t_1$+2 ms.,)

$t_2$ being the instant of the first descending zero (I passes from $I^+$ to $I^1$) following ($t_1$+2 ms.,) and $I^1$ representing a current which has become algebraically negative.

Automatic reiteration of the sequence attempts on abnormal current is acceptable provided the preselector is able to immobilize the two thyristor switches in a position compatible with switching. In fact, if under conditions where the current does not authorize switching, the tapping preselector was allowed to rotate, and the switch A being maintained on load, there would necessarily arrive an instant in which the mechanical contact associated with this switch would be led to interrupt the load current under the full voltage of the transformer. It goes without saying that such an operation would lead to the immediate destruction of the entire apparatus.

The sequential logical circuit, in addition to its function of orchestrating the switching, will also have to supervise the preselector to ensure its blocking in a position compatible with switching, this blocking being guaranteed until switching is successful, and at whatever instant the defect appears rendering the current unswitchable.

The installation comprises a basic logical circuit authorizing the development of the typical switching sequence for a not very disturbed load current, and correction loops, each of which establishes a prohibition as a function of a definite disturbance.

BRIEF DESCRIPTION OF DRAWINGS

The circuits will be described below in detail with reference to the drawings, in which FIG. 1 is a diagrammatic representation of the functioning of the tapping preselector, given as a reminder;

DETAILED DESCRIPTION OF INVENTION

All the stores contained in the logical circuit of the invention are advantageously formed by bistable trigger circuits consisting of two inverters in interrelation. A zero applied to one input causes a "1" to appear at the corresponding output, which returned to the other input gives "0" on the complementary output.

Figures 1A, 1B:
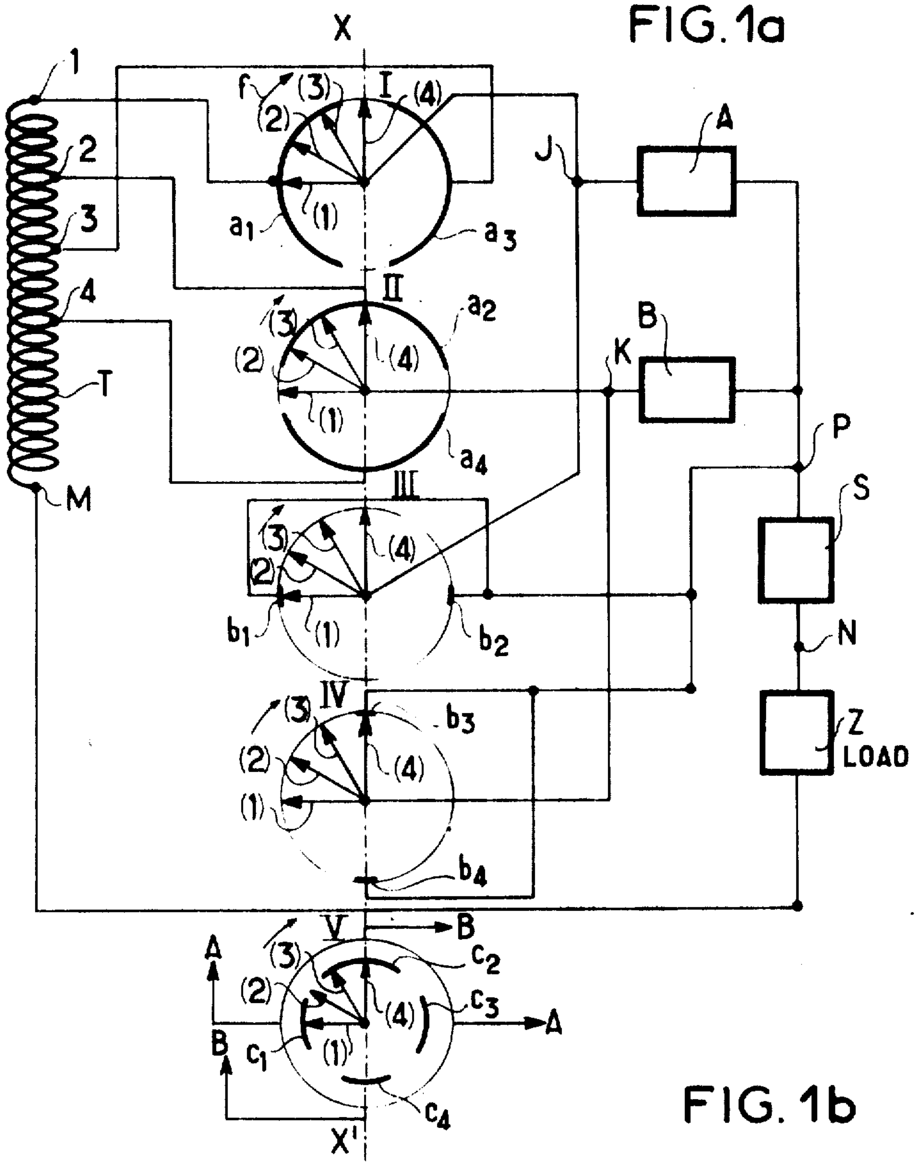
FIG. 1*b* is a table associated with the operation of the preselector according to FIG. 1*a*.

FIGS. 1*a*—1*b*. FIG. 1*a* is a reminder of the operation of the mechanical preselector described in the aforementioned patents.

In FIG. 1*a*, at T is shown a transformer winding having four tappings 1, 2, 3, 4. In practice, there may be a very much larger number of tappings; the reduction to four is for simplification. A and B denote two solid-state switches, formed for example of at least one pair of thyristors. These solid-state switches are both connected to the terminal of a detector S of the passage of the load current through zero, whose second terminal N is connected to a load Z, which is in turn connected to one end M of the winding T. The detector S, connected to the logical circuit by leads, not shown, serves to supply the logical valves $I^+$, $I^1$ used in the logical circuit.

The preselector is shown diagrammatically by five contac tor rollers I, II, III, IV, V, adapted to rotate about a spindle XX'.

The roller I carries two diametrically opposite conducting sectors, $a_1$ in contact with the tapping 1, $a_3$ in contact with the tapping 3, and a wiper which is connected to the noncommon terminal J of A. The roller II carries two sectors crosswise of the preceding sectors, $a_2$ in contact with the tapping 2, $a_4$ in contact with the tapping 4, and a wiper which is connected to the noncommon terminal K of B. These sectors have a relatively large angular width, for example 160°.

The roller III carries two conducting diametrically opposite sectors $b_1$ and $b_2$, both in contact with the aforesaid terminal P, and wiper in contact with the terminal J. The roller IV carries two conducting diametrically opposite sectors $b_3$, $b_4$, crosswise of the sectors $b_1$, $b_2$, in contact with the terminal P, and a wiper in contact with the terminal K. The sectors *b* have a relatively small angular width, for example 15°.

The roller V symbolizes the excitation device for the pulses initiating A or B; it is not a true representation of reality but presents, for simplification, the working principle of this ex citation device. The roller comprises four sectors $c_1$, $c_2$, $c_3$, $c_4$, of which $c^1$ and $c_3$ corresponding to the initiation of A, and $c_2$ and $c_4$ to the initiation of B. The wiper of the roller V has also a symbolic value; that is to say, when the wiper is opposite th sector $c_1$, the switch A receives initiating pulses; when it is op posite the sector $c_2$, it is B which receives the initiating pulses; when it is not opposite any sector, neither switch receives initiating pulses.

In fact, the excitation control of the initiating pulse generators comprises two sources of light, each of which can excite a phototransistor through circular slits cut in an opaque disc. This disc is driven by the spindle XX' of the preselector. For certain positions of the preselector, one of the phototransistors is illuminated, for other positions, the other phototransistor is illuminated; for intermediate positions, neither phototransistor is illuminated.

FIG. 1*b* is a table summarizing the conditions of the different rollers according to four positions (1), (2), (3), (4) of the wipers shown in the figure.

FIG. 1*b* illustrates the operation of the preselector in the device according to the invention.

In the table of FIG. 1*b*, the logical symbol 1 signifies that there is contact, symbol 0 signifies that there is no contact.

In column V, the indication A at position (1) signifies that the control circuits of switch A receive a logical signal confirming its closure; the indication B at the positions (3) and (4) signifies that the control circuits of the switch B receive a logical signal, initiating and confirming its closure. At the position (2), 0 signifies that no control circuit receives any order at this position.

Figures 2A, 2B:
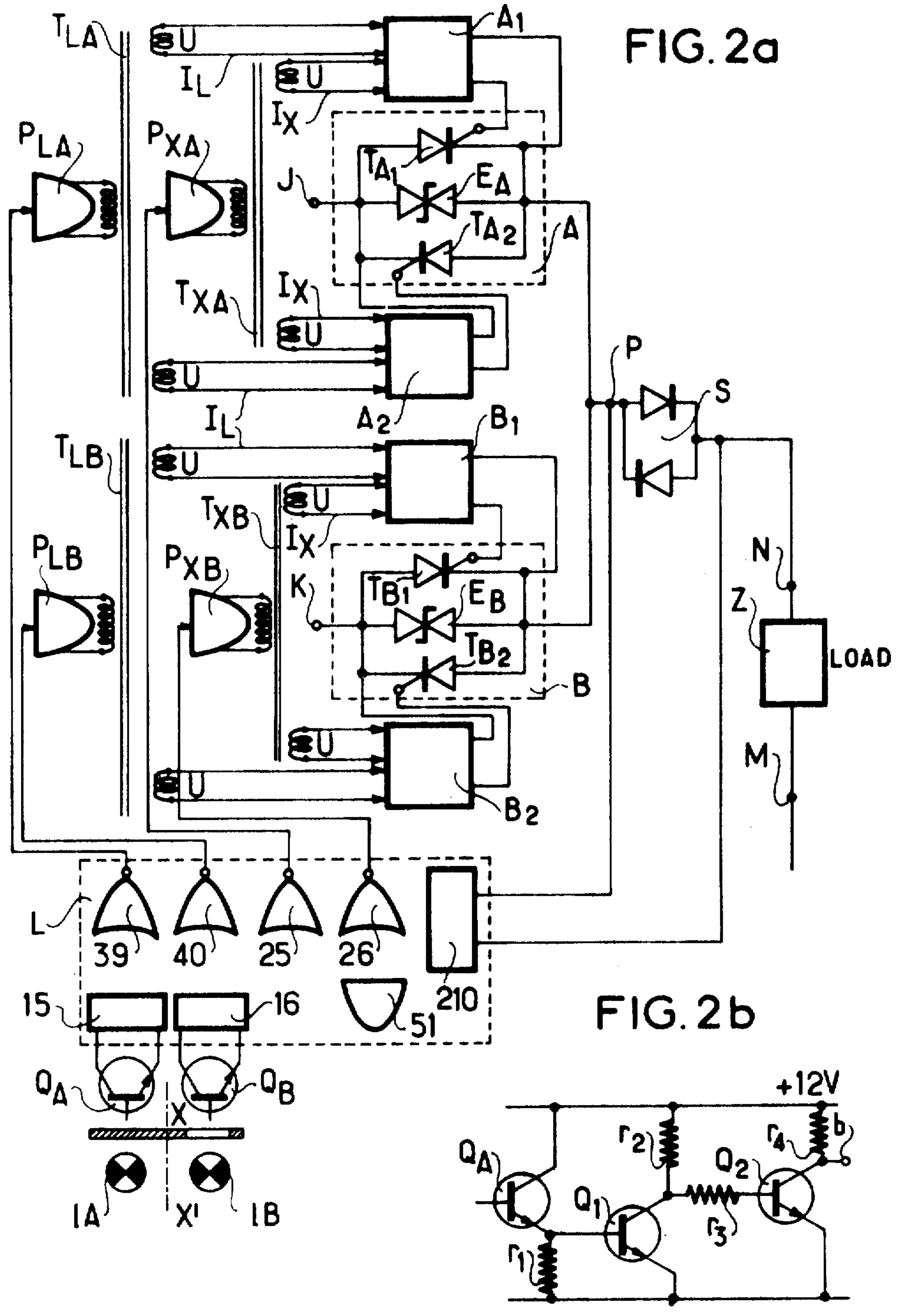
FIG. 2*a* is a synoptic diagram of the power switching device.
FIG. 2*b* shows the circuit of a phototransistor used in the preselector.

FIGS. 2*a*—2*b*. FIG. 2*a* shows the general arrangement of the control of the conducting or blocked states of the solid-state switches A, B.

In FIG. 2*a*, the same references have the same signification as in FIG. 1*a*.

The switch A comprises two thyristors connected in antiparallel TA1, TA2.

The initiation-blocking of the thyristors TA1, TA2 is controlled by two trigger circuits $A_1$, $A_2$, respectively, each receiving an initiation pulse $I_L$ or a blocking pulse $I_X$ from an initiation gate $P_{LA}$ or a blocking gate $P_{XA}$ across an initiation transformer $T_{LA}$ or a blocking transformer $T_{XA}$, respectively.

The gate $P_{LA}$ is itself controlled by a logical circuit L via the output of the $\overline{OR}$ gate 39, and the gate $P_{XA}$ via the output of the $\overline{OR}$ gate 25.

Likewise, the switch B comprises two thyristors $B_1$, $B_2$, connected in parallel in the inverse direction, and comprising similar elements connected in the same way: $P_{LB}$, $P_{XB}$, $T_{LB}$, $T_{XB}$, $\overline{OR}$ gate 40, $\overline{OR}$ gate 26.

The gate $P_{LB}$ is itself controlled by the logical circuit via the output of the circuit 40, and the gate $P_{XB}$ by the output of the circuit 26.

The logical circuit L is controlled by two phototransistors $Q_A$, $Q_B$ which are illuminated by two lamps 1A, 1B respectively according to the angular position of the disc D carrying circular slits and driven by the spindle XX′ of the preselector. This arrangement is described in detail in the above-mentioned French patents.

The logical circuit also comprises a polarity detector 210 for the load current $I^+$ or $I^1$, connected to the terminals of the diode shunt S, as well as a preselector blocking device 51, whose operation will be explained in detail with reference to FIG. 20.

FIG. 2*b* illustrates the connection of a phototransistor such as $Q_A$ (or $Q_B$) which is connected between a +12-volt lead and earth in series with a resistor $r_1$. The emitter of $Q_A$ is applied to the first stage of a two-stage direct coupling amplifier comprising two transistors $Q_1$, $Q_2$ having their emitters grounded and collectors connected to the +12-volt lead by resistors $r_2$, $r_4$. The collector of transistor $Q_1$ is connected to the base of transistor $Q_2$ by means of a resistor $r_3$.

When the phototransistor $Q_A$ (or $Q_B$) is illuminated, its internal resistance is very low, the transistor $Q_1$ is saturated, and therefore $Q_2$ is disconnected; the output terminal *b* is at about +12 v. which is the logical value 1. In the absence of illumination, the output transistor $Q_2$ is saturated, the terminal B is at a potential of nearly 0; this is the logical value 0.

Figure 3A:
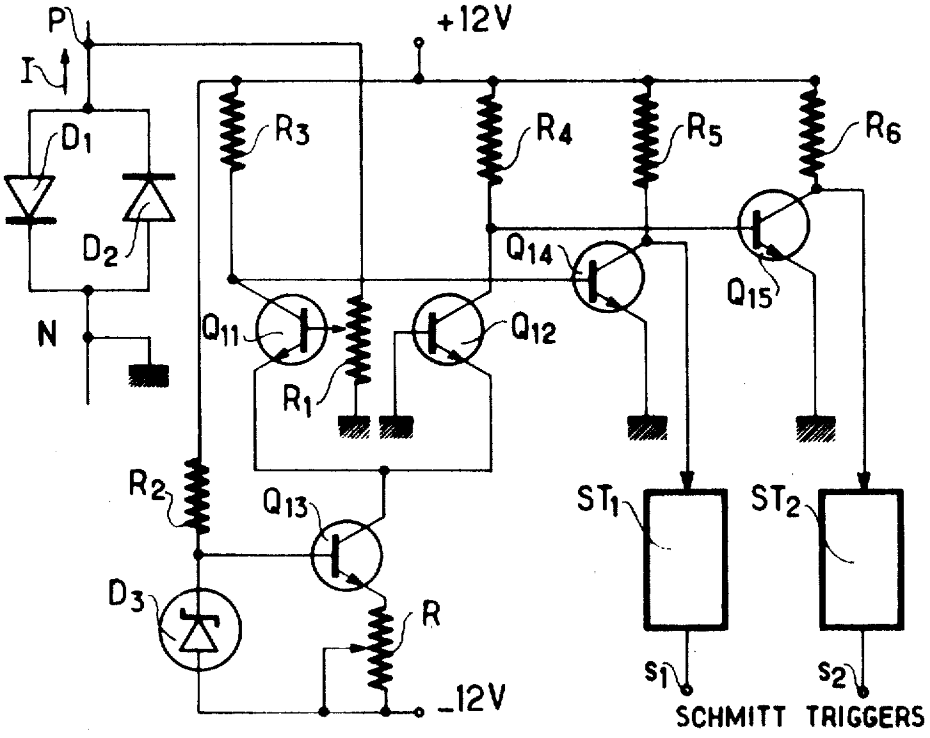
FIG. 3*a* is the basic circuit diagram of a diode shunt for detecting the zeros of the load current.
Figure 3B:
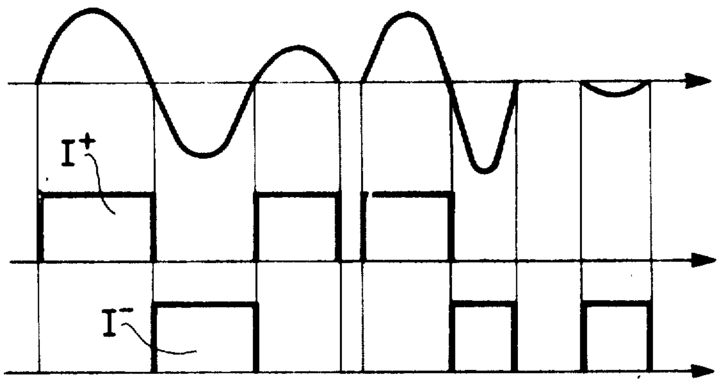
FIG. 3*b* is a graph showing the generation of the signals $I^+$, $I^1$.

FIGS. 3*a*, 3*b*. FIG. 3*a* is a diagram of the detector of $I^+$ and $I^1$.

The power diode shunt $D_1D_2$ has a grounded terminal $N_1$ and the other terminal P is grounded across a potentiometer $R_1$, the wiper of which is connected to the base of a transistor $Q_{11}$ which, with a transistor $Q_{12}$, whose base is grounded, forms a differential amplifier. The collectors of these transistors $Q_{11}$ and $Q_{12}$ are connected to +12 v. across respective resistors $R_3$, $R_4$, while their emitters are connected to −12 v. across a transistor $Q_{13}$, whose base is maintained at a fixed potential by a Zener effect diode $D_3$ in series with a resistor $R_2$ connected to +12 v. The emitter of transistor $Q_{13}$ is connected to −12 v. by means of a variable resistor R.

The collectors of $Q_{11}$ and $Q_{12}$ are connected respectively to the base of a transistor $Q_{14}$ ($Q_{15}$), whose emitter is grounded, while the collector is loaded by a resistor $R_5$ ($R_6$).

The collector of $Q_{14}$ is connected to a Schmitt trigger circuit BS1, the collector of $Q_{15}$ is connected to a Schmitt trigger circuit BS2; these two Schmitt trigger circuits function as shapers.

In view of connections of the transistor $Q_{13}$, it will be seen that it operates with constant current. Since its collector is loaded by the two transistors $Q_{11}$, $Q_{12}$ of the differential amplifier in common, it follows that this differential amplifier itself operates with constant current.

The Schmitt trigger circuits give a steep front, independently of the form of the real current. The detection threshold of the diode shunt is about 60 ma., that is to say, extremely low for a power circuit. For a positive load current $I^+$, exceeding 60 ma. in module, the trigger circuit BS1, output $s_1$, gives a logical level 1=+12 v. approximately. For a negative load current $I^1$ exceeding 60 ma. in module, the trigger circuit BS2, output $s_2$ gives a logical level 1=+12 v.

For nonzero load current, the logical states of the terminals $s_1$, $s_2$ are complementary. When the load current is zero, the terminals $s_1$, $s_2$ are at the logical level 0.

These results are illustrated in FIG. 3*b*, showing the logical levels corresponding to the polarities $I^+$, $I^1$ and at 0, supplied by the respective trigger circuits according to the value of the load current.

FIGS. 4*a*, 4*b*, 4*c*, 4*d*—FIG. 4*a* is the diagram of an abnormal zero detector of the positive current ($I^+$). An abnormal current zero is here a passage of the current through zero without changing polarity.

A sinusoidal or approximately sinusoidal current passes through zero twice per period – once between the positive alternation and the negative alternation, this is the descending zero and once between the negative alternation and the positive alternation, this is the ascending zero.

The abnormal zero is here the passage of the current through zero without changing polarity; either a flat shape with a segment merged with the time axis and return at the same polarity, or at a point of reflection (cusp).

The principle of the circuit is to store the successive signs of the derivatives of the current between the first passage of $I^+$ through a descending zero and the reappearance of $I^+$ through a descending zero, and to effect the synthesis of the state of these stores on the arrival of the ascending zero.

The circuit comprises three branches, whose outputs are connected to the three inputs of an $\overline{AND}$ circuit 52 followed by an $\overline{AND}$ circuit 46 of output *d*.

The first branch fed by the signal $I^+$ contains a derivator circuit 53 whose output is applied to one input of a bistable trigger circuit 56/57. This circuit stores the positive derivatives of $I^+$ (signal $S_1$).

The second branch, also fed by $I^+$, comprises an inverter 52 followed by a derivator 54 whose output is applied to an input of a bistable trigger circuit 58/59. This branch stores the negative derivative of $I^+$ (signal $S_2$).

The third branch, fed by $I^1$, comprises a derivator 55 followed by a bistable trigger circuit 60/61. This branch stores the positive derivative of $I^1$ (signal $S_3$).

All the derivators used in the apparatus function as follows: In response to the presence of a 0—1 transition applied to the input, the derivator delivers a 1—0—1 pulse; in response to a 1—0 transition, the derivator remains in its state of rest (logical level 1).

In the entire apparatus, the monostable and bistable trigger circuits consist of $\overline{AND}$ gates which respond only to solicitations of the above-mentioned 1—0—1 type.

An $\overline{AND}$ circuit 62 has a first input connected to the output *c* of the trigger element 56, a second input connected to the output a of the trigger element 58, a third input connected to the output *b* of the trigger element 61 complementary of the output *b′* of the trigger element 60 acted upon by 55.

A zero resetting signal is applied to the trigger elements 57, 59, 61 by a circuit connected to the output of the derivator 53, which comprises a delay circuit 63, for example a monostable trigger circuit, whose duration has been fixed at about 40 $\mu$s., and a derivator circuit 65; between the two is inserted a logical inverter 64. After zero resetting we have 0 at *c*, 0 at *a*, 1 at *b*, 0 at *d*.

Figure 4A:
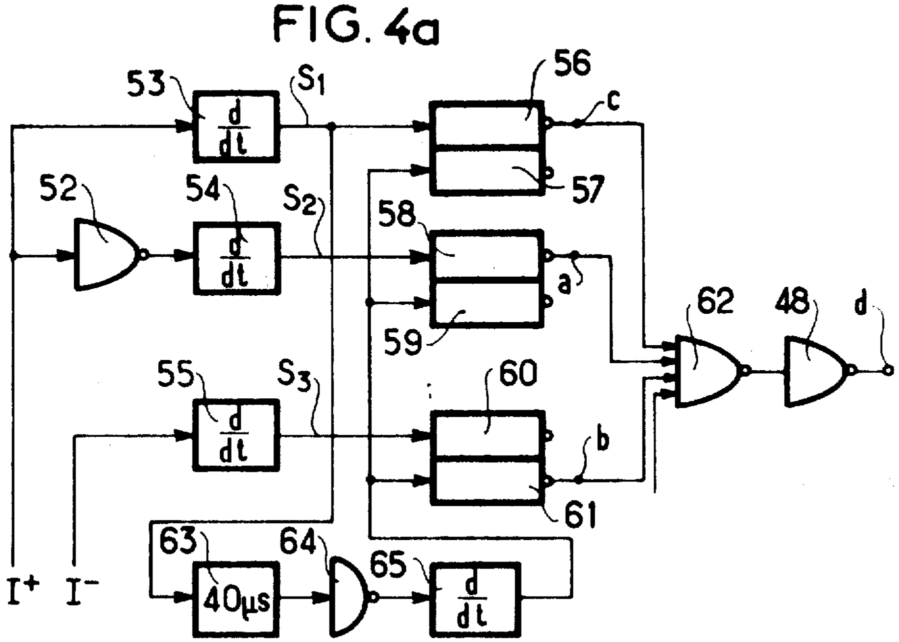
FIG. 4*a* is a circuit diagram of an abnormal zero detector of the positive current.
Figure 4B:
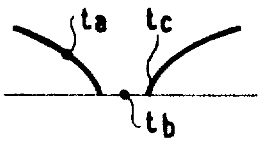
FIGS. 4*b* and 4*c* are graphs serving to explain the operation in the case of an abnormal zero.

FIG. 4*b* shows the operation in the case of an abnormal zero, also called in the following a "tangent zero."

At $t_a$, the negative derivative of $I^+$ marks a 1 at *a*;

At $t_b$ nothing happens, *b* keeps its 1;

At $t_c$ a 1 appears at *c*. The logical product 1-1-1 causes a (1) to appear at *d*.

This 1 will persist for an interval of 40 s., until zero resetting is effected by the branch 63, 64, 65. The pulse 0—1—0 of 40 μ s. (15) thus obtained translates the detection of this abnormal zero.

Figure 4C:

This detector functions with the same reliability on a cusp, FIG. 4c.

Figure 4D:
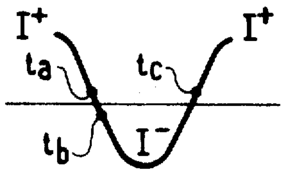
FIG. 4*d* is a graph corresponding to a normal zero.

FIG. 4d is a graph showing the operation in the case of a normal zero.

If the current zero is normal, it is easy to see that the circuit retains a (0) at d, since the store 60/61 marks a (0) at b at the instant $t_b$ (FIG. 4d).

Figure 5A:
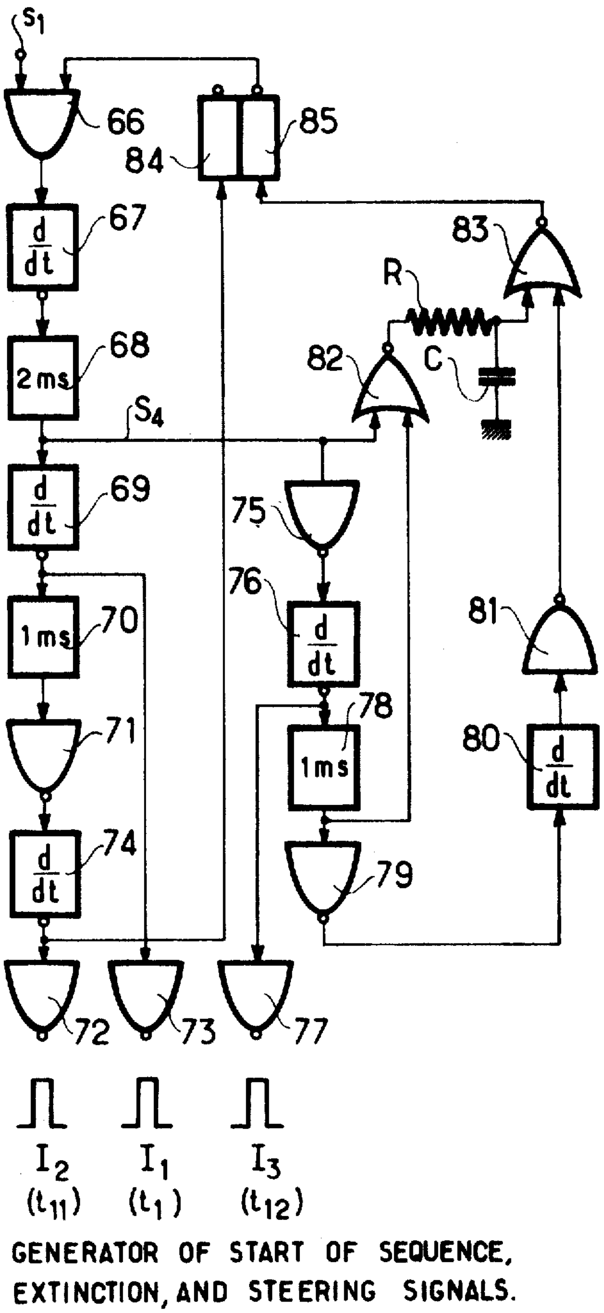
FIG. 5*a* is a diagram showing the generating members for various signals used in the logical circuit, as well as the reiterator elements.
Figure 5C:
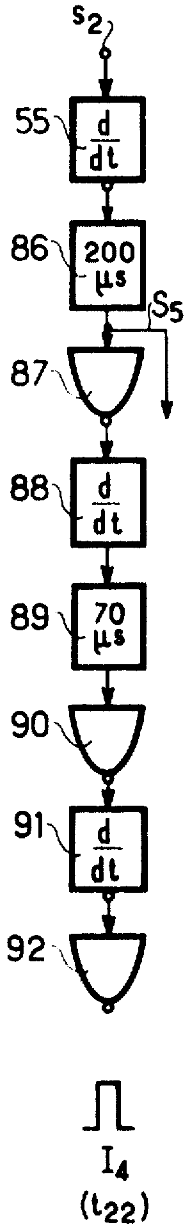
FIG. 5*c* is a diagram of a generator of other logical signals.
Figure 5B:
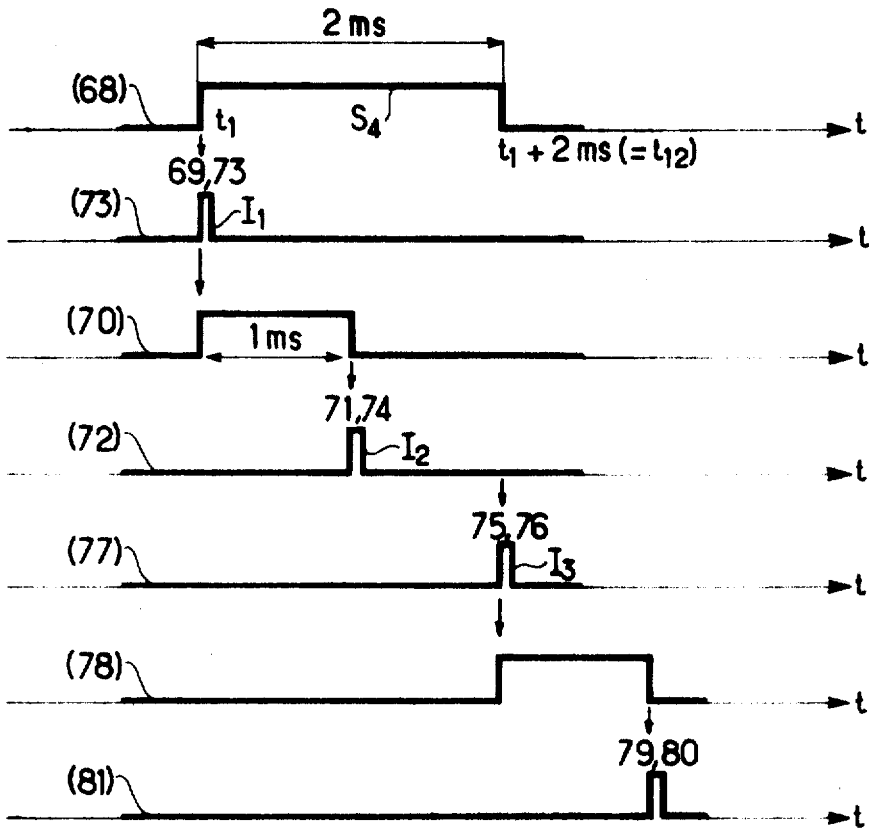
FIG. 5*b* is a set of graphs showing the output signals produced by the subset of FIG. 5.

FIGS. 5a, 5b, 5c – FIG. 5a is a diagram showing the mode of generation of signals used in the switching sequence, as well as the constituent elements of the reiterator.

The output terminals $s_1$ of the Schmitt trigger circuit BS1 (FIG. 3b) is connected to an input of an AND gate 66, the origin of a chain of circuits comprising:

Derivator 67 – monostable trigger of 2 ms., 68 – derivator 69 – monostable trigger of 1 ms., 70 – inverter 71 – derivator 74 – inverter 72.

At the output of the derivator 69 an inverter 73 is connected in parallel with the input of the monostable trigger 70.

Connected to the output of the monostable trigger 68 in parallel with the input of the derivator 69 is a chain of circuits comprising:

Inverter 75 – deviator 78 – monostable trigger of 1 ms., 78 – inverter 79 – derivator 80 – inverter 81.

An $\overline{\text{OR}}$ circuit 82 receives the output signal of 68 (signal S4) and the output signal of 78.

An $\overline{\text{OR}}$ circuit 83 receives the output signal of 81 and, after an integrator RC, the output signal of 82.

A trigger circuit 84/85 receives at the input of 84 the output signal of 74, at the input of 85 the output signal of 83. The output of 85 is connected to an input of the gate 66.

At the output of the inverter 72 is collected a pulse I2 (at the time $t_1$+1 ms., i.e. $t_{11}$), at the output of 73 a pulse I1 at the time $t_1$, and at the output of an inverter 77 connected to the output of the derivator 76 is a pulse I3 at the time $t$+2 ms., i.e. $t_{12}$.

FIG. 5b is a set of graphs showing the output signals of some of the circuits and indicating the interrelations between these signals.

The circuit 68 gives a tooth commencing at $t_1$, finishing at $t_1$+2 ms. ($t_{12}$). This is the signal S4.

By means of the circuits 69, 73, the ascending front of the tooth S4 gives a pulse $I_1$ at $t_1$. The pulse $t_1$ triggers a tooth of 1 millisecond to 70. The descending front of this tooth, by means of 71, 74 supplies a pulse $I_2$ to 72 at $t_1$+1 ms. ($t_{11}$). The descending front of S4, by means of 75, 76, supplies a pulse I3 to 77 at $t_1$+2 ms. ($t_{12}$). This pulse of inverse sign applied to 78 produces a tooth of a duration of 1 millisecond between $t_{11}$ and $t_{12}$. The descending front of this tooth, by means of 79, 80, supplies a pulse to 81 at $t_{12}$+1 ms.

The reiterator functions as follows:

c. Without the circuit 82.

At the instant $t_1$ the monostable trigger 68 supplies a 2 ms. tooth, the ascendant front of which triggers, by means of the derivator 69, the monostable trigger 70 for 1 ms. from $t_1$. This mode of operation guarantees for the monostable trigger 70 a recovery time of at least 1 ms., since it is the 2 ms. tooth of the monostable trigger 66 which triggered it at $t_1$.

At $t_{11}$, by means of 71 and 74, a pulse is obtained, routed;

1. to 72 for giving the pulse 12; and
2. to the store 84/85 for ensuring blocking of the gate 66 by the appearance of a (0) at the output of 85.

Thus, solicitation of the derivator 67 is prohibited, and therefore solicitation of the monostable trigger 68 is prohibited, until the trigger 84/85 is reset to zero at the end of a time such that the monostable trigger 68 has had the time to recover.

As soon as the monostable trigger 68 returns to (0) at $t_{12}$, it triggers by 75, 76 the monostable trigger 78 of 1 ms., the function of which is precisely to arrange the recovery time of the monostable trigger circuit 68.

At the time $t_{12}$+1 ms., by means of 79, 80, 81, 83 the store 84/85 is reset to zero. The output of 85 applies a (1) to the gate 66.

At this moment, two hypothesis may be formulated:

1. at the moment of zero resetting, the load current is $I^+$. Then 66 is acted on by a stationary (1), due to the presence of $I^+$, and by the jump 0—1, due to the change of state of the store on zero resetting. The derivator 67 is acted on by a front 0—1, despite the stationary state of $I^+$, and trips the monostable trigger 68 again at the instant $t_{12}$+1 ms.; therefore 3 ms. have separated $t_1$ (j) from $t_1$ (j+1).

2. At the moment of zero resetting, the load current is 0 or $I^1$. The reiterator stops, despite the presence of a (1), due to the zero resetting of the store. The output of $I^+$ is (0). On the appearance of $I^+$, the output of 66 will undergo a transition 0—1, despite the stationary state (1) of the store 85. The derivator 67 will therefore trip a fresh sequence.

b. With the circuit 82.

On application of voltage in the absence of $I^+$, the store 85 occupies an indifferent position. If this position is such that the output of 85 is (0), the sequence reiterator will be unable to start on the appearance of $I^+$ and renders impossible any switching attempt.

A corrective circuit is necessary which will have to satisfy the following two criteria:

1. In the absence of $I^+$, the reiterator being blocked, this circuit should position 85 on (1) so that the appearance of $I^+$ will cause the reiterator to start by unblocking 66.
2. When the reiterator functions correctly, the corrective circuit should not disturb its functioning.

The whole functions as follows:

In the absence of $I^+$, neither the monostable trigger 68 nor the monostable trigger 78 is at (1). The output of 82 is at (1). The output of 83 passes to (0) and positions 85 on (1).

As soon as there is $I^+$, and the reiterator functioning, either the monostable circuit 68 or the monostable circuit 78 is at (1). Circuit 82 supplies a (0) at the output and has no effect on 83 which may therefore be acted on by the (1)'s from the normal chain (78, 80, 81).

The function of the integrator RC between the output of 82 and the input of 83 is to make good the delay between the descending front of 68 and the ascending front of 78. Finally, due to the corrective loop, starting of a sequence is ensured in all cases.

FIG. 5c shows the device for generating a pulse $I_4$ at the time $t$+270 μs., i.e., $t_{22}$.

Connected to the terminal $s_2$, output of the bistable trigger circuit $BS_2$ (FIG. 3a), is a chain comprising: Derivator 55, 200 μs. monostable trigger circuit, 86 – inverter 90 – derivator 9 – inverter 92.

The function of these various elements is obvious and does not need lengthy description.

At the output of 86 there is collected a tooth S5 commencing at $t_2$ and terminating at $t_2$+200 μs., i.e., $t_{21}$.

At the output of 92 there is collected a pulse 14 at $t_2$+270 μs., i.e., $t_{22}$.

Figures 6A, 6B, 6C:
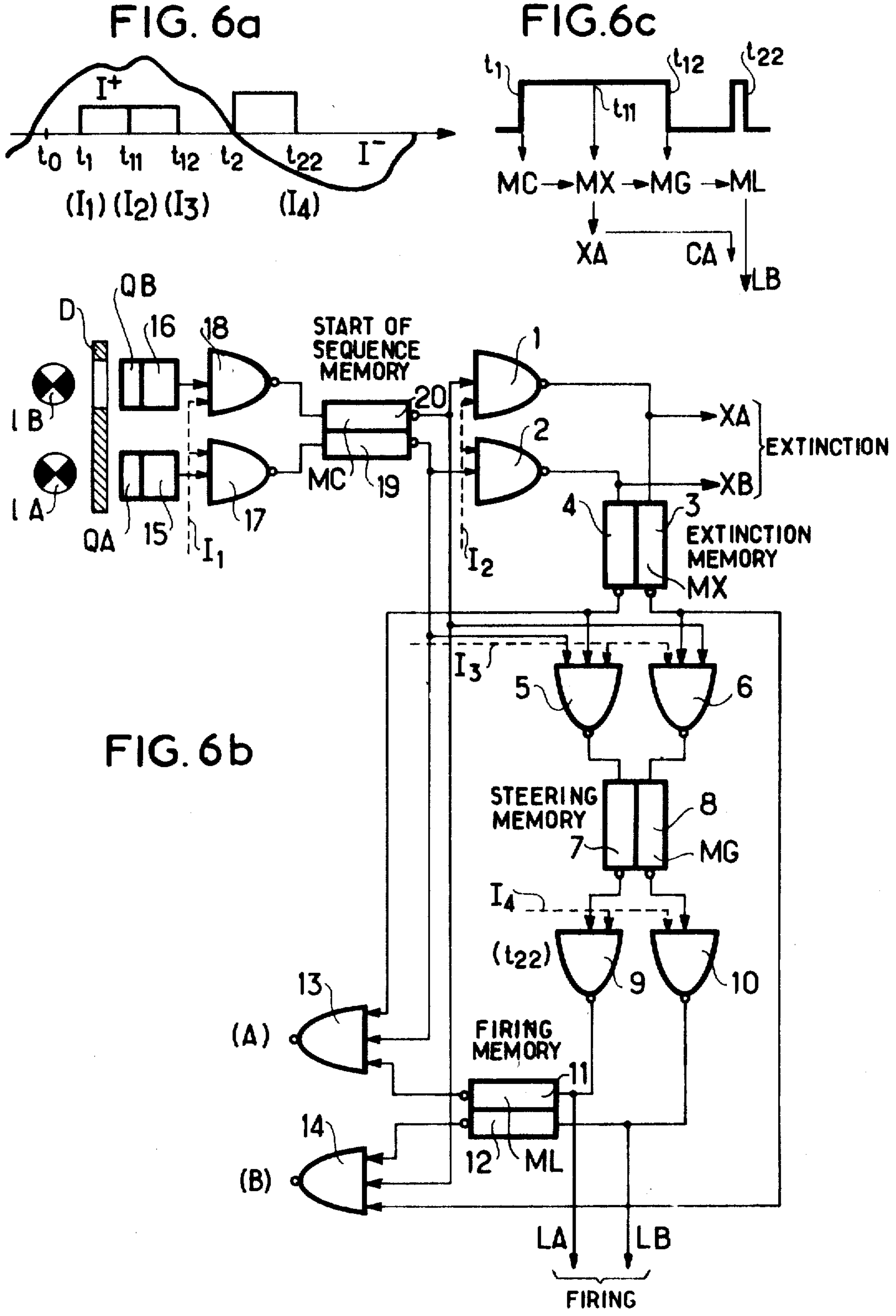
FIG. 6*a* is a graph showing a not very disturbed form of current authorizing switching.
FIG. 6*b* is a diagram of the corresponding basic logical circuit.
FIGS. 6*c*, 7*b*, 8*b*, 9*b* are diagrams of the times showing the interrelation between various corresponding logical events.

FIGS. 6a, 6b, 6c – FIG. 6a shows a period of a current of quasisinusoidal form with a positioning of $t_1$ rendering switching possible.

FIG. 6b shows the basic circuit of the logical system, ensuring correct switching for the conditions shown in FIG. 6a.

The pulse at $t_1$ is denoted by $I_1$, the pulse at $t_{11}$ is denoted by $I_2$, the pulse at $t_{12}$ is denoted by $I_3$, and the pulse at $t_{22}$ is denoted by $I_4$.

The references IA, IB, D, QA, 15 and 18 have the same significance as in FIG. 2a.

The circuit comprises a control order store MC (elements 19, 20), a gate current extinction order store MX (elements 3,4), an ignition order routing store MC (elements 7,8) and an ignition store ML (elements 10,12).

The circuit also comprises: two $\overline{\text{AND}}$ gates 17,18 receiving, on the one hand, the output signals of the elements 15 and 16, respectively, and the pulse $I_1$; two $\overline{\text{AND}}$ gates 1,2 receiving the output signals of 19 and 20, respectively, and the pulse $I_1$; two $\overline{\text{AND}}$ gates 5,6, receiving the output signals of 19 and 20, respectively, of 4 and 3, respectively, and the pulse 13; two $\overline{\text{AND}}$ gates 9,10 receiving the output signals of 7 and 8, respectively, and the pulse 14; two $\overline{\text{AND}}$ gates 13 (test A on load) and 14 (test B on load), which have three inputs connected to the outputs of 19, 4 and 11 and of 20, 3 and 12, respectively.

The elements of even number in series 2, 4, 6, 8, 10, 12, 14 ensure the switching from A to B.

The installation is symmetrical, the elements of odd number 1, 3, 5, 7, 9, 11, 13 would ensure switching from B to A.

The operation is as follows: (The logical symbols (0), (1), are shown in brackets)

At the time $t_0$, the phototransistor $Q_B$ is illuminated and a (1) appears at the output of 16. The pulse I1 causes a (1) to appear, whence a (0) at the output of 18, a (1) at the output of (20), and a (0) at the output of 19. There is a (1) at an input of 1.

The pulse $I_2$ causes a (1) to appear at the other input of 1, thus a (0) at the input of 3, a (1) at the output of (3) and a (0) at the output of 4.

At the pulse $I_3$, there are three (1's) at the input of 6, thus a (0) at the input of 8, a (1) at the output of 6 and a (0) at the output of 7.

At the pulse $I_4$, there are two (1)'s at the inputs of I0, therefore a (0) at the input of I2, and a (1) at the output of I2. There are three (1)'s at the input of I4, and a (0) at the output; this zero means that switching is terminated.

The output (0) of 1 controls the stoppage of the gate current of the thyristors of the switch A (XA); the output (0) of I0 controls the ignition of the thyristors of the switch B (LB).

The diagram of the corresponding times is shown in FIG. 6*c*. In FIG. 6*c*, MC signifies starting of the control order store, MX starting of the A extinction order store, MG starting of the routing store, ML starting of the B ignition store, XA extinction of the gate current of A, CA extinction of A, and LB ignition of B. The vertical arrows indicate events, the horizontal arrows indicate subordinations.

The diagram of the corresponding times is shown in FIG. 6*c*. In FIG. 6*c*, MC signifies starting of the control order store, MX starting of the A extinction order store, MG starting of the routing store, ML starting of the B ignition store, XA extinction of the gate current of A, CA extinction of A, and LB ignition of B. The vertical arrows indicate events, the horizontal arrows indicate subordinations.

Figure 7A:
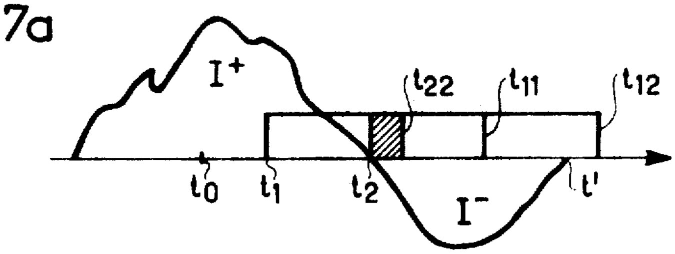
FIGS. 7*a*, 8*a*, 9*a*, 10*a*, 11*a*, 12, 13*a*, 14*a*, 15, 16*a*, 17, 18, 19 present different examples of situations in which switching must be prohibited.
Figure 7B:
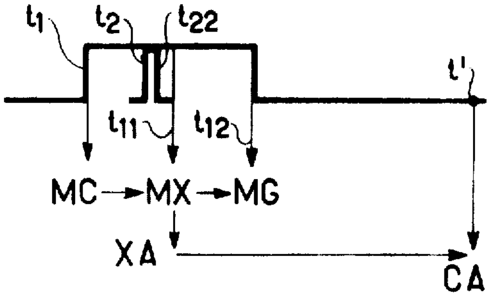
Figure 7C:
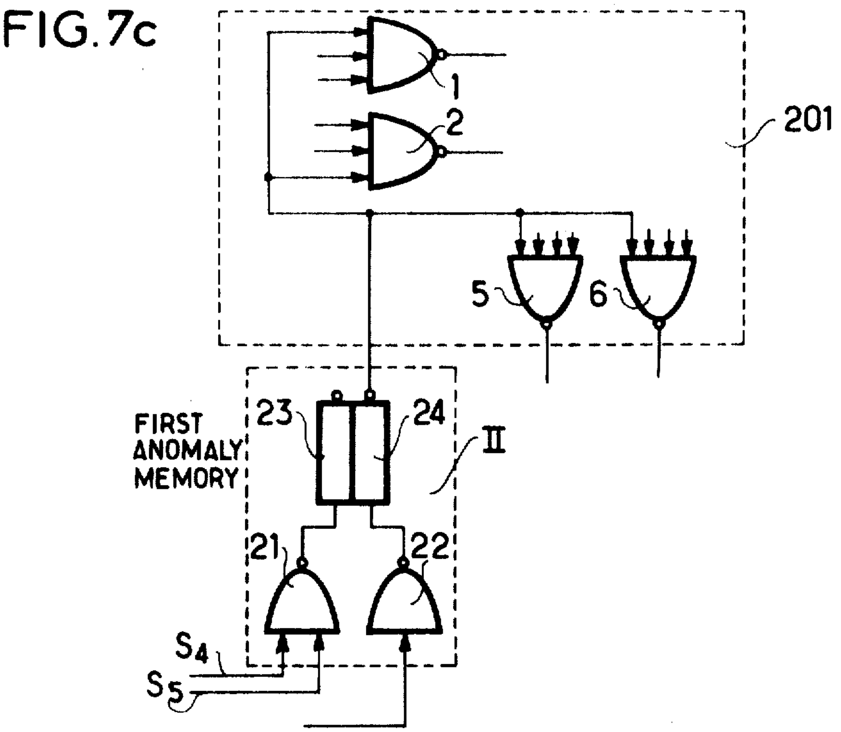
FIGS. 7*c*, 8*c*, 9*c*, 10*b*, 11*b*, 13*b*, 14*b*, 16*b* are diagrams of various correction circuits.

FIGS. 7*a*, 7*b*, 7*c* – FIG. 7*a* shows the case where the current having an almost normal form, as in FIG. 6*a*, the instant $t_1$ is situated such that the interval $t_2$—$t_{22}$ is contained in the interval $t_1$—$t_{12}$. It will be seen in the diagram of the times in FIG. 7*b* that since $t_{22}$ occurs before $t_{12}$, there is no order for the ignition of B.

However, A has received an opening order, and opens completely at the instant $t'$, ascending zero, or sometimes even at the instant $t_{11}$. As B will not ignite before the descending zero following $t'$, during a complete alternation, the load current would have to pass through the protection elements, which is inadmissible. In the face of such an anomaly, the extinction of A must be prevented, whereupon another sequence will be attempted by the action of the reiterator.

FIG. 7*c* shows the correction circuit and which figure comprises three parts: In the box 201 are shown the elements of the basic circuit of FIG. 6*b* which are improved: gates 1 and 2 principally, and gates 5 and 6. The box II contains the correction elements. The box II comprises two $\overline{\text{AND}}$ gates 21,22 and a bistable trigger circuit 23/24, forming an anomaly store (MA), each element of which is connected to one of the gates, respectively. The gate 21 on two inputs receives the tooth $S_4$ and the tooth $S_5$. The gate 22 receives the pulse $I_1$ as zero-resetting command. The output of the element 24 is connected to an input of the gates 1 and 2 and to an input of the gates 5 and 6.

If the tooth $t_2$—$t_{22}$ has a part in common with the interval $t_1$—$t_{12}$ (case of FIG. 7*a*), at the instant $t_2$, two (1)'s appear at the input of the gate 21, and therefore (0) appears at the output of 24; this zero, applied to the gats 1 and 2, blocks the transmission of the order for the extinction of A (see FIG. 6*b*). The same zero, applied to gates 5 and 6, maintains the trigger circuit MC in the state of rest corresponding to the switch A on load (7/8, FIG. 6*b*).

The pulse $I_1$ which is produced in the next current period, returns the correction circuit to zero.

Figures 8A, 8B:
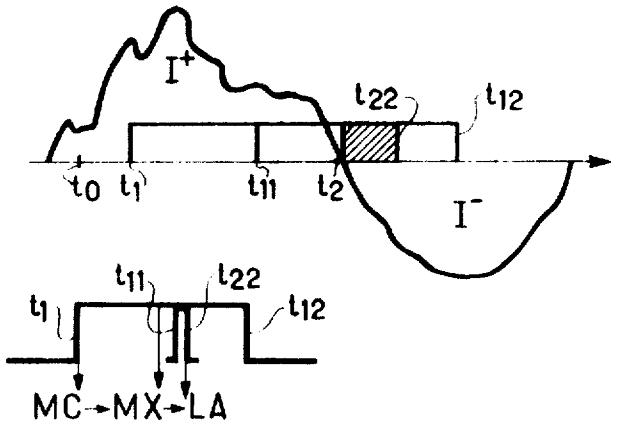
Figure 8C:
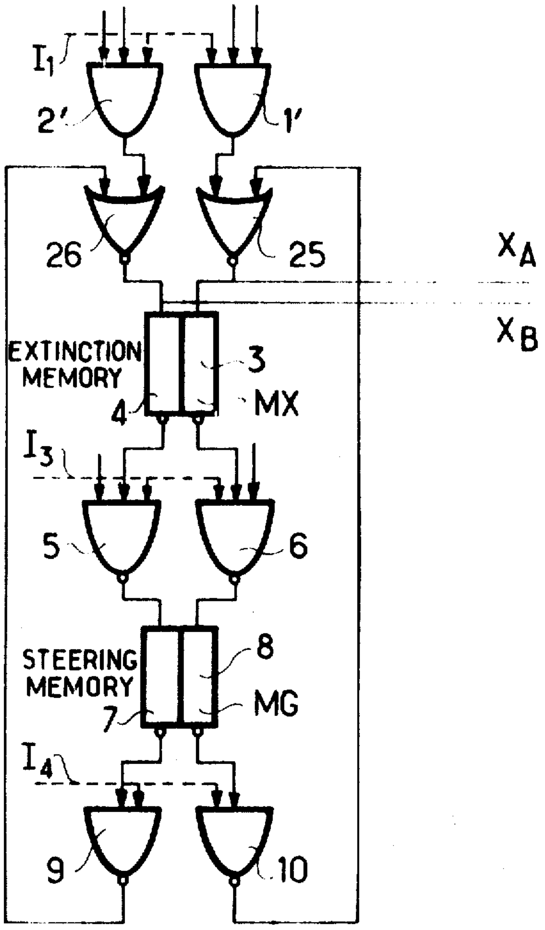

FIGS. 8*a*, 8*b*, 8*c* – In FIG. 8*a*, the current is still of quasisinusoidal form, but the position of $t_1$ is such that the interval $t_2$—$t_{22}$ is included in the interval $t_{11}$—$t_{12}$.

The time diagram of FIG. 8*b* shows that the ignition order emitted at $t_{22}$ is directed to A and not to B, since the routing store MG triggers only at the time $t_{12}$. Therefore, the order is given to reignite A.

Since the store MX becomes operative at $t_{11}$, there is (1) at the output of 3. At $t_{12}$, the trigger circuit MG becomes operative, the ignition order is thus sent forward to B; therefore B can reignite at the next passage from $I^+$ to $I^1$; and the two switches will be ignited at the same time. This is the realization of a step short circuit. Correction is therefore necessary.

Correction is ensured by the arrangement shown in FIG. 8*c*; the $\overline{\text{AND}}$ gates 1 and 2 are replaced by $\overline{\text{AND}}$ gates 1′ and 2′, respectively, in series with $\overline{\text{OR}}$ circuits 25,26, respectively. The output of 9 is connected to the input of 26, and the output of 10 is connected to the input of 25.

The operation is as follows: As soon as A receives the reignition order at $t_{22}$, a pulse for the extinction of B by the output of 9 is sent via the $\overline{\text{OR}}$ gate 26. This pulse has no effect on B, which is still cutout, but it repositions correctly the store MX in the state A on load, that is to say (1) at the output of 4, (0) at the output of 3 and therefore at the input of 6. The routing MG remains at the position A on load. This state is furthermore confirmed, due to the correction already made at the gates 5 and 6 in FIG. 7*c*.

Figure 9A:
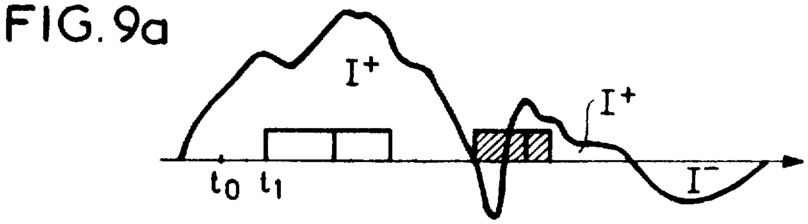
Figure 9B:
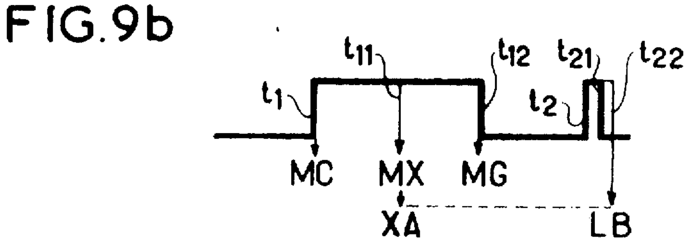
Figure 9C:
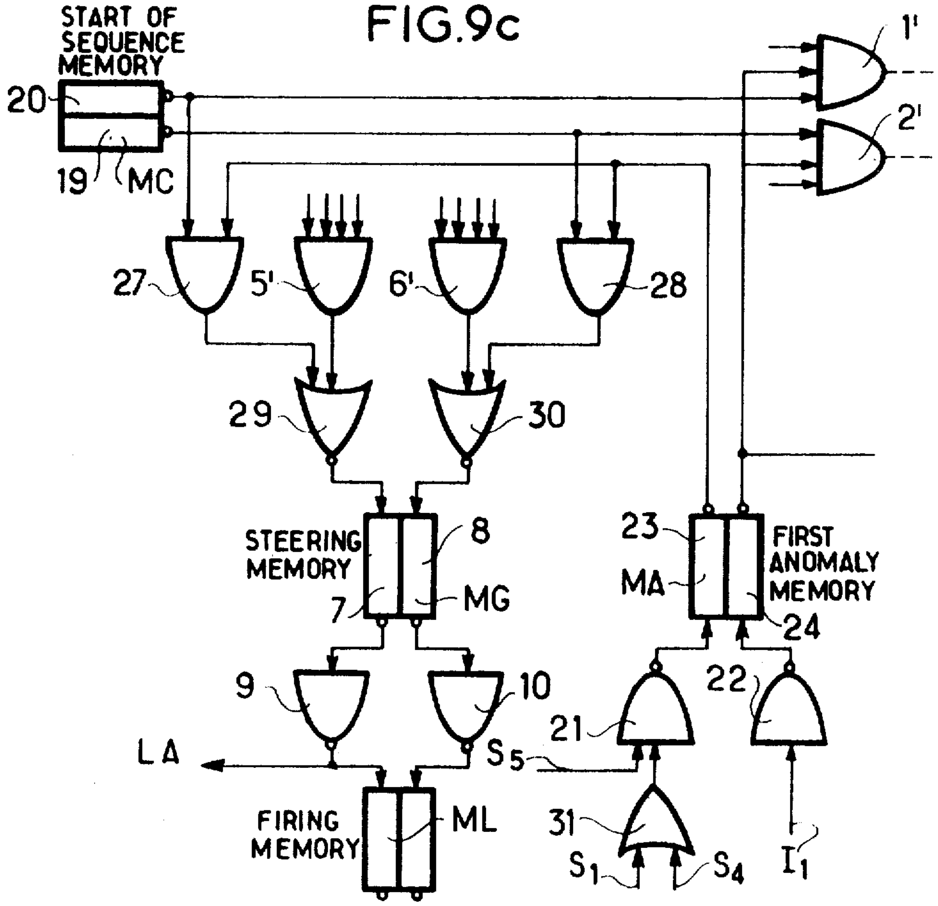

FIGS. 9*a*, 9*b*, 9*c* – FIG. 9*a* shows a form of current having, after a positive alternation, a short trough of $I^1$, of base less than 200 $\mu$s., followed by a fresh passage to $I^+$.

The result is that the 200 $\mu$s. tooth commencing at $t_2$ is intersected by the ascending zero produced between $t_2$ and $t_{21}$. The reappearance of $I^+$ less than 200 sec. after disconnection of A incurs a risk of the reignition of A.

This is shown in the time diagram *ob* by the suppression of the CA effect normally following the XA control (see FIG. 6*c*), but which is not produced with certainty in the present case.

The solution in this case comprises reignition of A, prohibition of the ignition of B and repositioning of the logical circuits. This is possible by means of the correction loop of FIG. 9*c*.

FIG. 9*c* reproduces the set comprising the store MA and gates 21,22 of FIG. 7*b*. An OR circuit 31 is added. The OR circuit 31 receives the signals S1 and S4, the gate 21 receives the signal S5 and the output signal of the circuit 31 (see FIG. 7*c*).

On the other hand, the $\overline{\text{AND}}$ gates 5 and 6 are replaced by AND gates 5′ and 6′, connected to the input in the same way as the said gates 5 and 6. Between the output of 5′ (6′) and the input of the trigger circuit MG, there is an $\overline{\text{OR}}$ gate 29(30) connected on the one hand to the output of gate 5′ (6′), and on the other hand to the output of an AND gate 27(28), having an input connected to the output of the element 20(19) of the trigger circuit MC, and an input connected to the output of the element 23(24) of the trigger circuit MA.

There is coincidence between the tooth $t_2$—$t_{21}$ (signal $S_5$) and the positive derivative of $I^+$(signal $S_1$ transmitted by 31). This coincidence found by 21 is stored in MA. The output of 23 passes to (1). The store MG is routed to ignition of A on detection of the coincidence due to the gate 27.

At $t_{22}$ the reignition pulse will be directed to A via the gate 9. At the same time, the trigger MX is put in the correct position extinction of B.

Figure 10A:
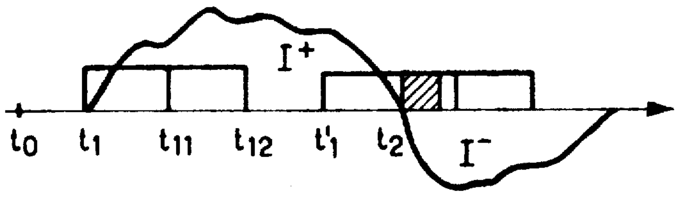
Figure 10B:
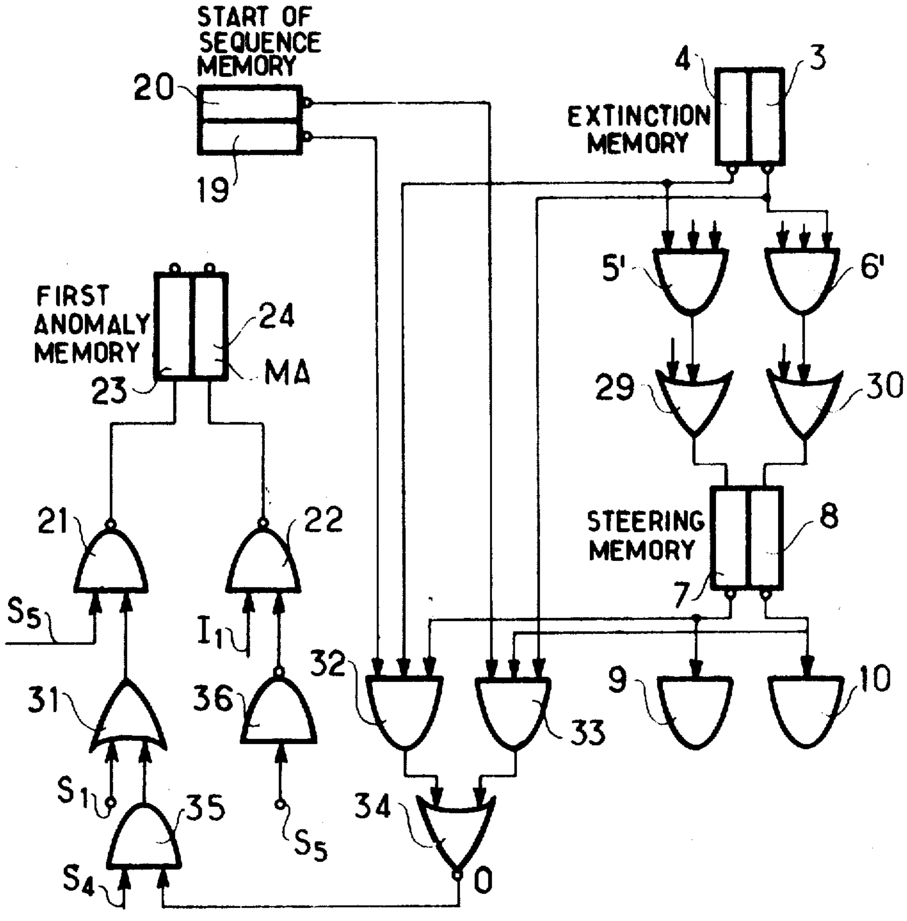

FIGS. 10*a*, 10*b*—The situation to which the next circuit responds is shown in FIG. 10*a*; the reiterator has initiated a previous sequence at the commencement of an alternation $I^+$, for example $t_1$ coincides with an ascending zero. In principle, the order to ignite B should be given at the following descending zero. This descending zero, however, is distant from $t_1$ by more than 3 ms. The reiterator will therefore initiate another sequence at $t'_1=t_1+3$ ms. However, this second sequence (or a following one) may have an anomaly already encountered: tooth $t_2—t_{22}$ within the tooth $t_1—t_{12}$. The correction circuits of FIGS. 7c and 8c will intervene for correcting a defect which, in the present case, is illusory, because in fact there is nothing to oppose the prepared switching. The reiterator corrects by refusing the switching and by returning A to load, whereas switching was possible at $t_{22}$.

It is therefore necessary to prohibit this correction, once the following three conditions have been realized:

1. Order to switch to B in store MC;
2. Suppression of the gate current of the thyristors of A, effected at $t_{11}$; and
3. Store MG routed to ignition of B at $t_{12}$.

The solution is given by the circuit of FIG. 10b, which comprises: two AND gates, 32(33), having three inputs connected to: the output of 19(20), the output of 4(3), and the output of 7(8). The outputs of gates 32, 33 are connected together at the input of an $\overline{OR}$ circuit 34, the output of which is connected to the input of a two-input AND gate 35, which receives the signal $S_4$ at the other input. The output of gate 35 is connected to the input of the OR circuit 31, already described with reference to FIG. 9c.

At the instant $t_{12}$, when the three preceding conditions are realized, the gate 33 gives (1) as output, and the gate 34 gives (0). This (0) applied to gate 35 and transmitted to gate 21 by OR circuit 31, prohibits the effect of the coincidence of the tooth $t_2—t_{22}$ with the tooth $t_1—t_{12}$ by leaving the store MG at rest.

Figure 11A:
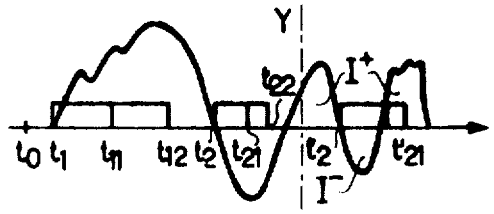
Figure 11B:
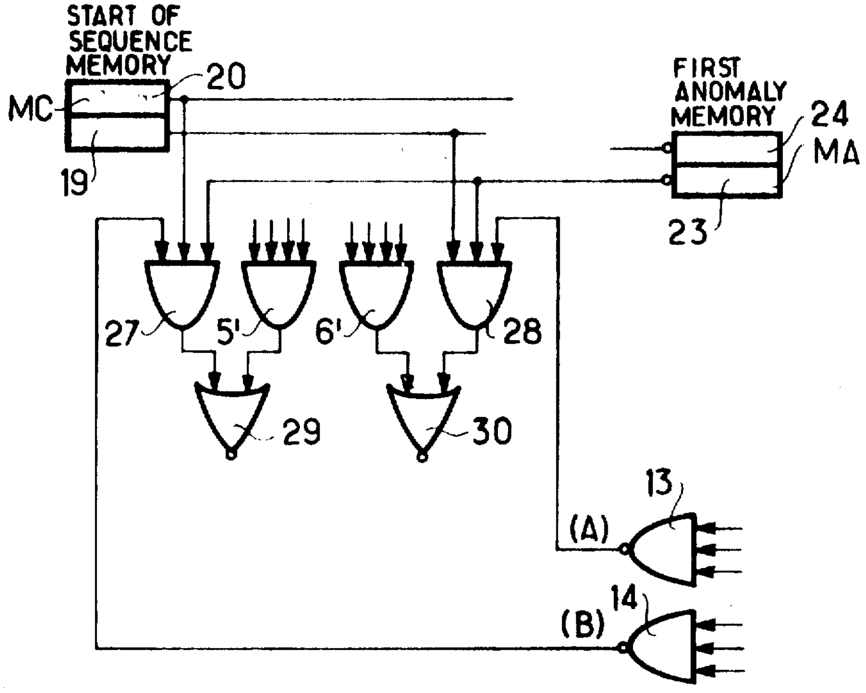

FIGS. 11a, 11b—On the left of the line marked Y IN FIG. 11a, the situation of the orders relative to the current is normal and permits switching. A has been opened and B closed. On the right of the line Y, however, there is a passage from $T^{116}$ to $I^{115}(t'_2)$ less than 200 μs. after a passage from $I^{115}$ to $I^1$. However, the function of the circuit of FIG. 9c is to reignite A in the presence of such a situation. There would be a step short circuit. It is therefore necessary to prohibit the correction of the circuit of FIG. 9c in the present situation.

FIG. 11b shows the very simple correction circuit adopted. It consists in a connection between the output of gate 14(13) and the input of gate 27(28). In fact, the switching of B on load having succeeded, we have (0) at the output of 14; and the test of B on load (see description of FIG. 6b). This (0) applied to the input of 27 prevents the untimely correction.

Figure 12:
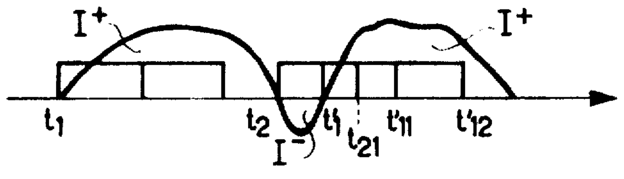

FIG. 12 —The situation shown in FIG. 12 is as follows: after a first sequence attempt, commenced at the ascending zero ($t_1$), a descending zero starts the interval $t_2—t_{21}$. The current changes polarity rapidly, however, and passes through an ascending zero less than 200 μs. after $t_2$. It is assumed that this ascending zero is produced 3 ms after $t_1$, there is therefore a recommencement of sequence.

The appearance of $I^+$ forms an anomaly which prohibits switching (see FIG. 9a). The store MA must therefore be put in operation. On the other hand, the new $t_1$ which appears has the task of putting the store MA at rest (FIG. 7c ). There is therefore a conflict. Correction being a matter of priority, this $t_1$ must be prohibited from operating the resetting to zero. This is achieved by applying the signal $S_5$ to an inverter 36, whose output is connected to the input of gate 22 (FIG. 10b). Thus, the appearance of the tooth $s_5$ under these conditions applies a (0) to gate 22 and prevents the pulse $I_1(t_1)$ from returning the trigger circuit MA to zero.

The cases of the prevention of switching which still have to be considered concern passages of the current through zero without changing sign ("tangent zero").

Figure 13A:
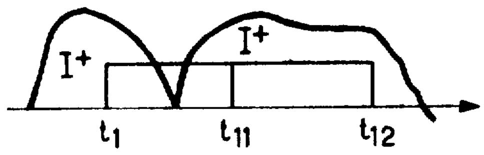
Figure 13B:
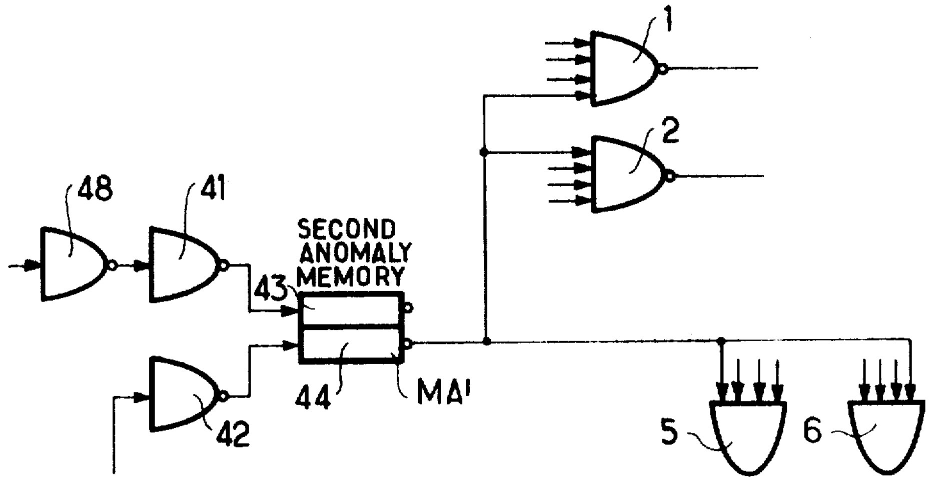

FIGS. 13a13b —In FIG. 13a, the tangent zero appears between $t_1$ and $t_{11}$

Switching must be refused and A must be reignited immediately, since it has been decided to switch only on the appearance of $I^1$; in fact, if the gate current of A is interrupted at $t_{11}$, the current $I^+$, which has just started, cannot have a sufficient value at $t_{11}$ to maintain condition of A to the instant $t_2$.

The correction circuit of FIG. 13b comprises an anomaly store MA' (43/44) fed by two inverters 41,42. The input of 41 is connected to the output of 48 (see FIG. 4c), the input of 42 receives the pulse $I_1$ at $t_1$.

The tangent zero, detected by the apparatus described with reference to FIG. 4a, leads a (0) to the output of 44, which blocks the gates 1 and 2, 5 and 6. The sequence does not commence. At the following instant $t_1$, the store MA' is reset to zero and a fresh attempt to switch may be started.

Figure 14A:
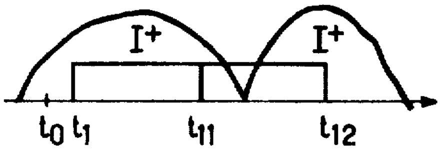
Figure 14B:
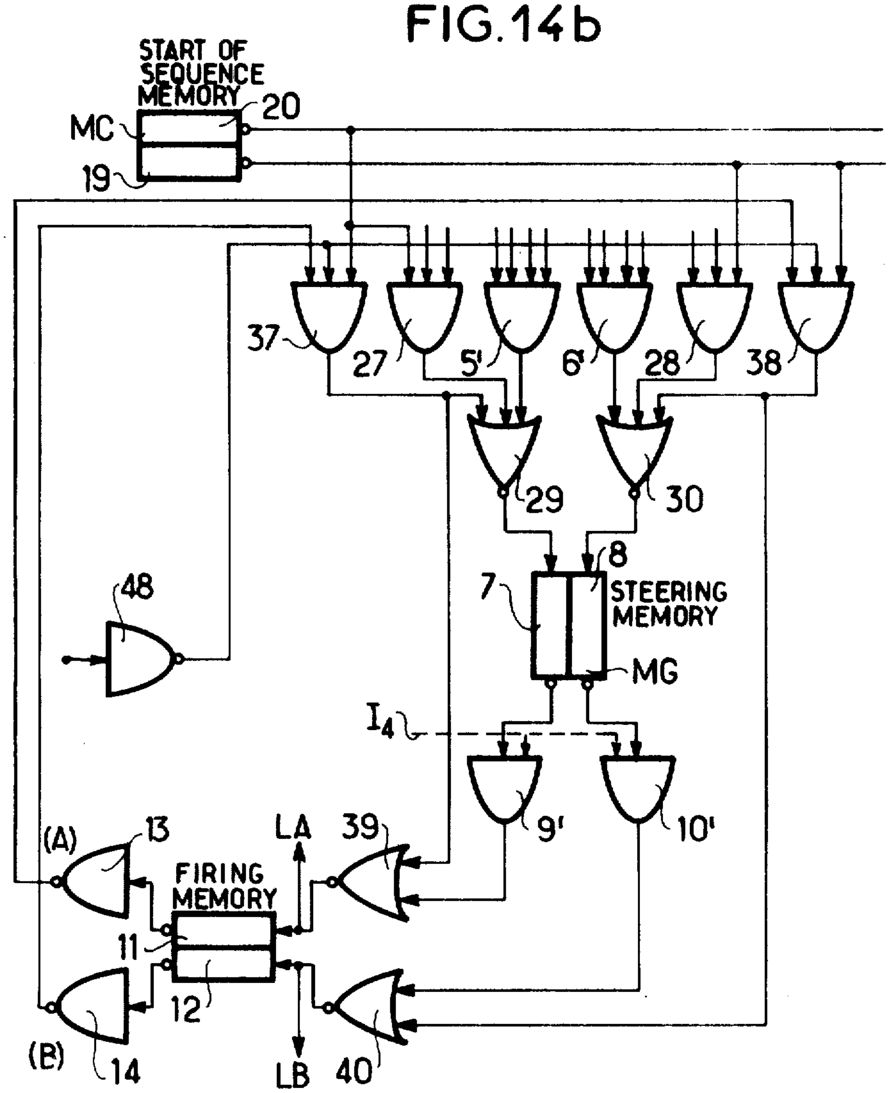

FIGS. 14a14b —In FIG. 14a, the anomaly is formed by a tangent zero occurring between $t_{11}$ and $t_{12}$. The gate current of A is suppressed, but B may not be ignited, therefore A must be reignited immediately.

In this case, the correction circuit shown in FIG. 14b, comprises on the one hand, above the $\overline{OR}$ gate 29(30) and AND gate 37(36) having three inputs: the output of 48, the output of 20(29), and the output of 14(13); and on the other hand, the $\overline{AND}$ gate 9(10) is replaced by an AND gate 9'(10') in series with an $\overline{OR}$ gate 39(40), which receives the output of 37(38) at another input.

As soon as the tangent zero appears, the gate 37 receives from 48 a pulsed (1). On the other hand, the output of 14 is at (1), since B is not on load, as well as the output of 20 (see FIG. 6b). Therefore, (1) appears at the output of 37 as does the following:

1. At the input of 29, an output pulse is given which confirms the routing of ignition of A, which had not altered, and 2At the input of 39, a signal, $I_5$, which orders the reignition of A, confirms the positioning of the store ML, repositions MX, which had triggered.

Figure 15:
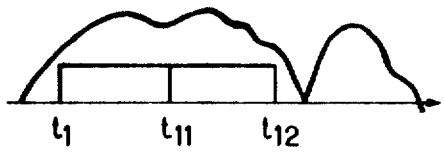

FIG. 15—FIG. 15 shows the appearance of a tangent zero after $t_{12}$.

Outputs 13 and 14 are at (1) as long as switching has not been done. At the tangent zero, A is reignited taking into account the previously made correction. On the other hand, the store MG must be rapidly repositioned to avoid untimely ignition of B on the appearance of the next $I^1$.

In the circuit of FIG. 14b, the pulse leaving 29 from 37 repositions MG, and the pulse leaving 39 repositions MX and A by 26.

In the two cases of FIG. 14a and 15, the outputs of 19 and 14 which are at (1) do not contribute any inhibiting action as long as switching from A to B has not been effected.

Figure 16A:
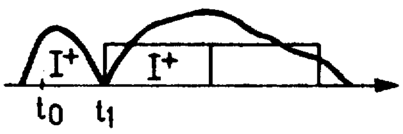
Figure 16B:
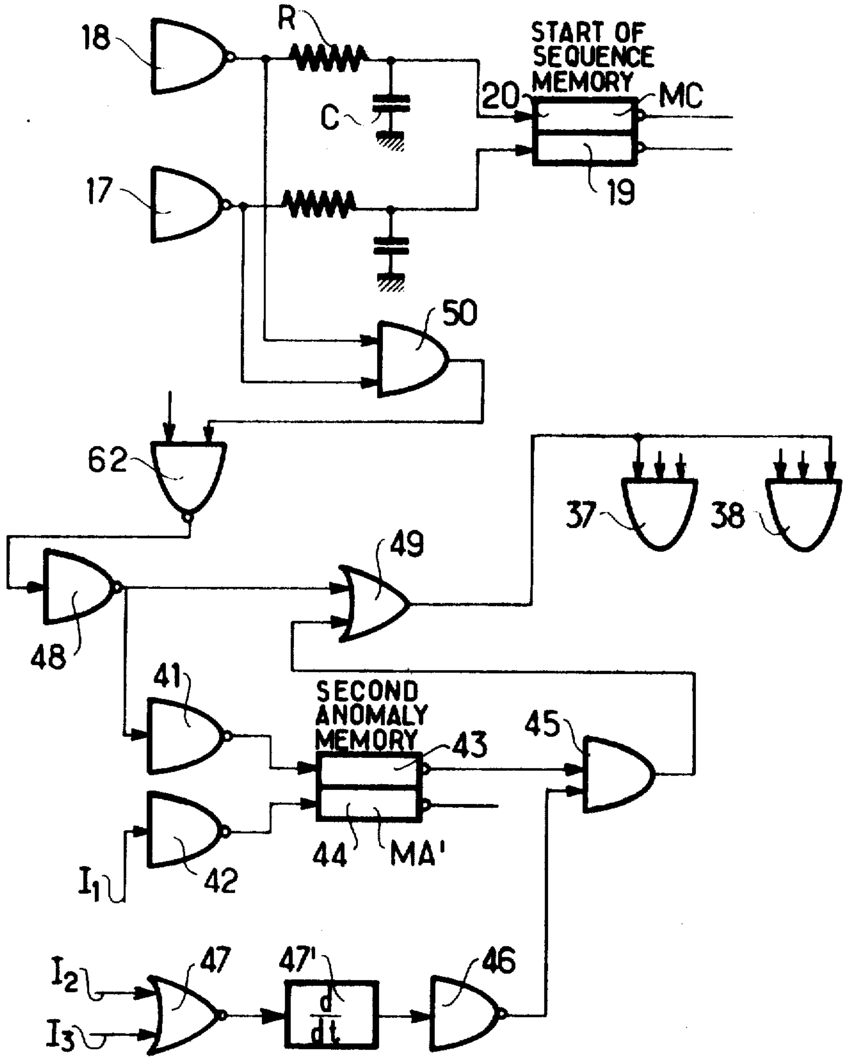

Once switching has been effected with B on load, the output of 14 passes to (0), and the output of A is at (1). Consequently, if a tangent zero appears after successful switching, the (0) at the output of 14 will block the corrective gate 37 and avoid an untimely order of the ignition of A while B is on load. FIGS. 16a and 16b —FIG. 16a shows a case of coincidence of tangent zero with $t_1$.

Under these conditions, the store MC will change state in a nonzero time, there is therefore a risk that part of the tangent zero pulse will be sent to 37 (FIG. 13b) for ignition of A and the other part to 38 for ignition of B.

FIG. 16b shows the following correction circuits, the function of which will be explained afterwards:

1. An integrator of RC or like type is connected between 17 and 19 (18 and 20), and an AND gate 50 receives on two inputs the output signals from 17 and 18;
2. An $\overline{OR}$ circuit 47 receives $I_2$ and $I_3$ and its output is connected to a derivator 47' whose output is connected to an inverter 46. The output of this inverter 46 is connected to one input of an AND gate 45 having two inputs, the other input being connected to the output of the element 43 of the store MA'; and
3. The output of the gate 50 is connected to the input of the gate 62 of the abnormal zero current detector. An OR gate 49 receives at one input the output of 48, at another input the output of 45 and applies its output to the input of 37 and 38.

There is no need to make any correction to the figure, since the switching sequence has not yet started. Nevertheless, the action of the reignition pulse $I_5$ is blocked.

Taking into account the fact that the pulse $I_5$ has a duration of 40 $\mu$s., and the that triggering of the store MC is not infinitely rapid, there is a risk of cutting $I_5$ into two parts, resulting in simultaneous ignition of A and B.

It is therefore necessary to block $I_5$ and authorize triggering of MC only after $I_5$ has been unblocked. This is effected by means of 50 and the RC integrators, the functioning of which is explained as follows:

In the absence of the pulse $I_1(t_1)$, gates 17 and 18 deliver (1) to the inputs of 50, which applies an authorization (1) to the gate 62 outside the instants $t_1$. At the instants $t_1$ on the contrary, 18 is at (0) for the duration of the pulse $I_1$. During $I_1$, therefore, 50 gives a (0) which immediately blocks the gate 62, which blocks the passage of the pulses $I_5$ for the duration of the pulse $I_1$.

Due to the RC integrators, the store MC will change state only with a slight delay relative to $I_1$. The gate 62 is blocked with the change in state of the store MC. Thus, the risk of cutting the pulse is eliminated.

Figure 17:
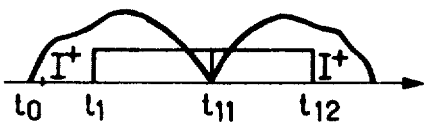

FIG. 17—The graph of FIG. 17 shows coincidence of the tangent zero with $t_{11}$.

At $t_{11}$, the basic sequence has programmed A extinguished. Tangent zero, however, requires A ignited. There is doubt as to the final state of the store power trigger circuits A1, A2 (FIG. 2*a*). There is also doubt as to the state of the store MX. This situation cannot be tolerated. A must be reignited with certainty and the extinction store MX repositioned.

The correction circuit is shown in FIG. 16*b*.

The solution consists in accepting the dilemma at the instant $t_{11}$, but to emit at $t_{11}+\epsilon$, $\epsilon$ being the width of the pulse $I_2$, a fresh pulse which this time will ignite A with certainty, and via 26, will reposition the store MX. This pulse is generated by the derivator 47', which receivers the pulse $I_2$ through the $\overline{\text{OR}}$ gate 47. The store MA', which has registered the tangent zero on its appearance, applies the signal (1) leaving 43 to the input of 45. At the instant $t_{11}+\epsilon$, the derivator, through the medium of 46, applies (1) in pulse to the second input of 45.

The pulse leaving 45 arrives at 37 through 49. The result is a pulse which will reignite A, through 37, 39, and will reposition MX through 29.

Figure 18:
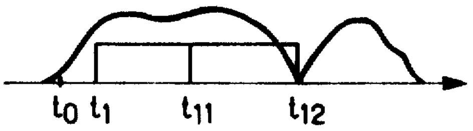

FIG. 18—The graph of FIG. 18 shows coincidence of the tangent zero with $t_{12}$.

At $t_{11}$, A was extinguished. At $t_{12}$, the normal sequence will route ignition to B. On the other hand, correction by gate 37 will route ignition to A.

For the power circuit, reignition of A is well effective through 37—39; for the logical circuit, on the contrary, although on the one hand the store MX is correctly positioned, there is doubt as to the position of the store MG. It is therefore necessary to reposition the store MG with certainty at $t_{12}+\epsilon$.

The correction circuit is that of FIG. 16*b*, but this time, the pulse $I_3$ is used in 47'. The rest of the process is the same as above.

Figure 19:
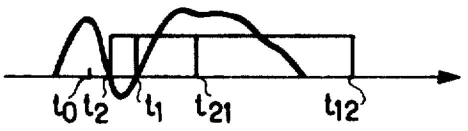

FIG. 19—FIG. 19 is not concerned with a case of tangent zero, but an ascending zero of $I^+$ occurring in an interval $t_2$—$T_{21}$and coinciding with a fresh $t_1$ due to the initiative of the reiterator.

Ascending zero occurring in an interval $t_2$—$t_{21}$ has already been met in FIG. 9*a*, corrected by the circuit of FIG. 9*c*. Correction is normally effected by the gate 27 or 28. Since at the instant $t_1$, the store MC is in the act of triggering, and part of the correcting signal runs the risk of being directed to 27, the other part to 28, whence a risk of step short circuit.

To obviate this risk, immediate blocking of 27 and 28 is operated on the instant $t_1$ by the gate 50 (see description of FIG. 16*b*), and the operation of the store MC is delayed by the RC integrators.

The store MC will change state without difficulty, since the gates 27 and 28 were blocked at the instant $t_1$. This correction does not cause any disturbance, since 27 and 28 are blocked only during $t_1$ pulses.

Figure 20:
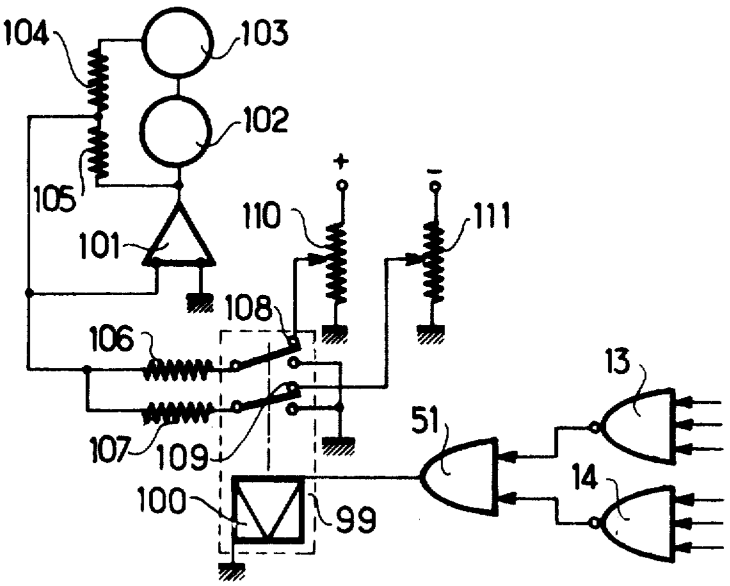
FIG. 20 is a diagram showing the device for supervision of the preselector by the logical circuit.

FIG. 20—FIG. 20 is a circuit diagram showing supervision of the mechanical preselector by the logical circuit. If switching has been stopped by the electronic logical circuit in the course of events, the completion of the rotation of the preselector from position 3 to position 4 (FIG. 1) will open the switch A on load. It is therefore necessary to prevent this eventuality.

The tapping preselector is positioned by a servomechanism of known type, comprising in particular a position copying potentiometer, an operational amplifier associated with a power amplifier, a quick-acting servomotor coupled to the preselector and a tachymetric dynamo, whose function is to ensure the correction of phase lead necessary for good damping of the servomechanism.

According to a conventional technique, summation of the three magnitudes: reference voltage, copying voltage, and tachymetric voltage is effected at the input of the operational amplifier, the sum being zero when the desired position has been attained.

Supervision is based on the principle of braking the preselector motor suddenly at position 3, and releasing it only when switch has succeeded; the logical circuit then destroys its braking order, and the operation continues to position 4. This mode of operation by anticipation provides the certainty of being able always to stop the preselector in position 3, safety position, which permits switching to be performed by the thyristors, and prohibits interruption of the load current by the mechanical contact associated with A.

The circuit comprises an AND gate 51, whose inputs are connected respectively to the outputs of the $\overline{\text{AND}}$ gates 13 and 14. The output of gate 51 serves to feed a relay 99 having a winding 100 which, ensuring insulation of the logical device with ground, may block the motor 102 of the preselector (not shown). The preselector, whose motor is coupled to a tachymetric dynamo 103 and controlled by a control exercised by means of a summation amplifier 101, receives at its input a copying signal by two potentiometers 110, 111, respectively, and performs the sum with a phase lead tachymetric signal by the network of resistances, known per se, 104, 105, 106, 107.

At $t_1$ (position 3, FIG. 1) the test A on load is interrupted, since the order of switching to B is registered. The gates 13 and 14 give (1) as output, therefore 51 energizes the blocking relay 100 which connects to ground the reference and copying inputs of the summation amplifier 101 of the control.

It is known that under these conditions, the tachymetric phase lead signal applies to the amplifier input a voltage of opposite sign relative to the unblocked state, whence the production of a violent braking back-current which rapidly stops the preselector in the desired position.

If switching succeeds, the test B on load passes to (0). The gate 51 supplies (0) as output, the relay 100 is deenergized. The control device resumes the control of rotation which is completed on position 4 (FIG. 1).

Figure 21A:
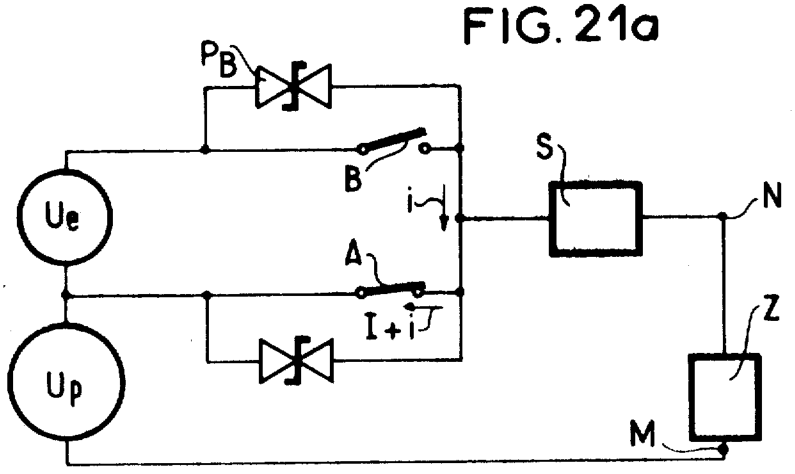
FIGS. 21*a*, 21*b*, 21*c* relate to an advantageous arrangement of multiple protective elements.
Figure 21B:
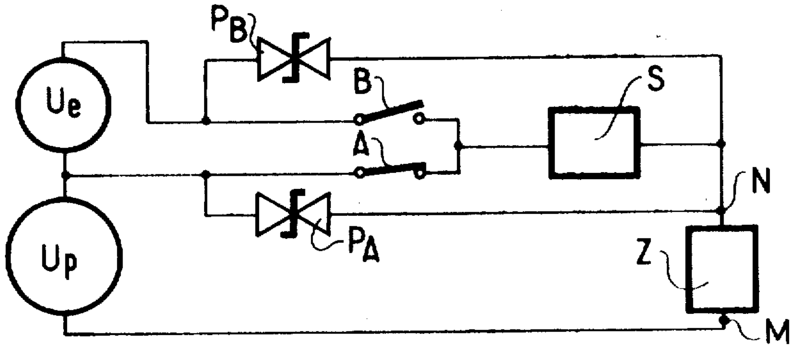
Figure 21C:
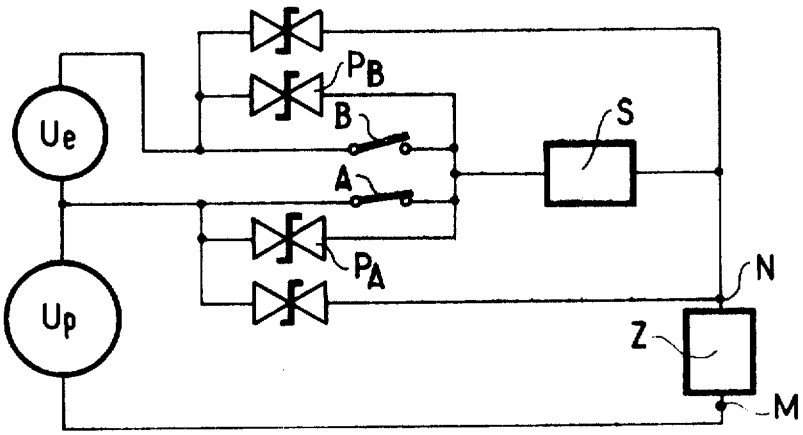

FIGS. 21*a*, 21*b*, 21*c*—These figures, to be compared with FIG. 2*a*, concern an arrangement whereby it is possible to minimize a difficulty encountered in processing the signals $I^+$, $I^1$ in the case where the current passing through the protection elements shunting an open switch is not negligible compared with the load current.

In these Figures, the same references denote the same elements.

$U_p$ denotes the principal winding of the tapped transformer, and $u_e$ a switching step between two tappings. The open switch B is shunted by a protection element $P_B$. The closed switch A is shunted by a protection element $P_A$. Following the point common to the two switches, at S, is the diode shunt acting as zero current detector, and the load Z, which includes the circuit on $U_p$.

In FIG. 21*a*, the load Z and hence the shunt S have the load current I flowing through them. Flowing through the protection element $P_B$ is *i*, the leakage current, therefore, the switch A does not pass the current I but the current I+*i*.

The diode shunt S, to which is connected the logical circuit, only sees I. But the determinant magnitude for the opening of A is I+$i$. As long as $i$<I, the zero detection error is negligible. The values of the parameters, however, require that a large number of protection elements, for example, 10, should be connected in parallel, and this should be is certainly no longer valid, and 10$i$ being no longer negligible compared with I, and in this situation, there is a risk of the introduction of disturbances in the detection of the zeros (with the danger of step short circuit.

To obviate this disadvantage, the circuit of FIG. 21*b* could be conceived, the 10 protection elements being connected to load at the point N. Under these conditions, the current of the protection elements no longer passes through A. The current in A is equal to the current in S. Therefore, detection of the zeros by the logical circuit is correct.

Actually, however, this circuit has a latent disadvantage. At the moment the two switches are open, and in particular for weak load currents, when the current becomes $I^1$ between $t_2$ and $t_{21}$, it is carried by the protection elements. Consequently, the shunt S does not see this current, the logical circuit is not warned of the presence of $I^1$; the switching sequence stops in the state of two open switches, the protection elements are overloaded since they ensure permanently the transfer of the load current and they are destroyed.

The solution adopted is shown in FIG. 21*c*. of the 10 elements, one is connected to the terminals of the switch, the other 9 are connected to the point N. Under these conditions, the difference between the current in the shunt S and the current in the switch A is only $i$, and not 10$i$; this difference of $i$ is negligible by hypothesis. Therefore, the detection of zeros by the shunt S is not disturbed.

However, at the moment A and B are both open, the diode shunt S has $I^1/10$ and not $I^1$ passing through it. This reduction, however, it not a serious disadvantage because of the sensitivity of the diode shunt which, under these conditions can still detect zeros of current in the weakest load currents occurring in practice.

Figure 22A:
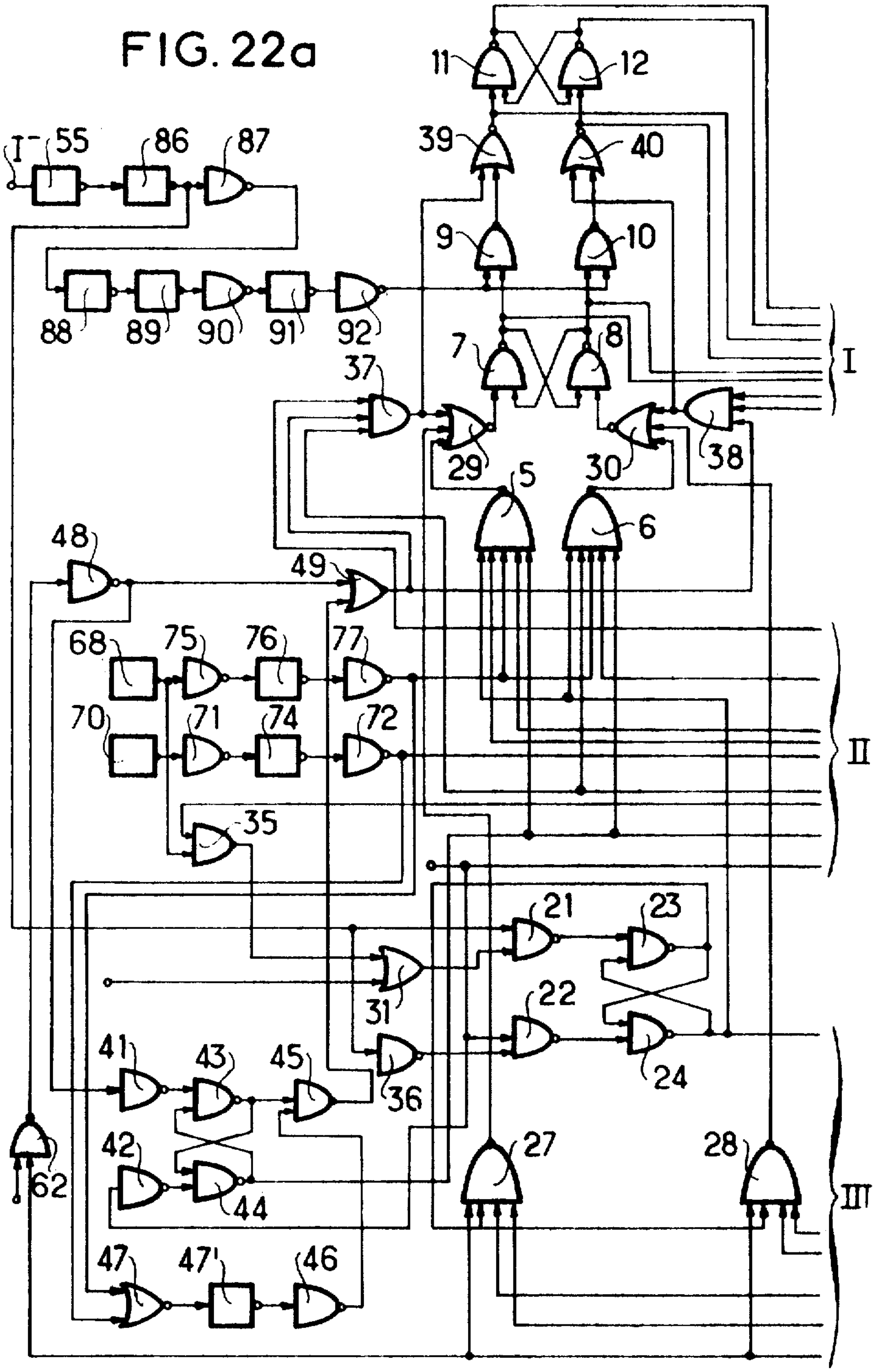
FIGS. 22*a*, 22*b* both together form a diagram of the whol of the logical circuit.
Figure 22B:
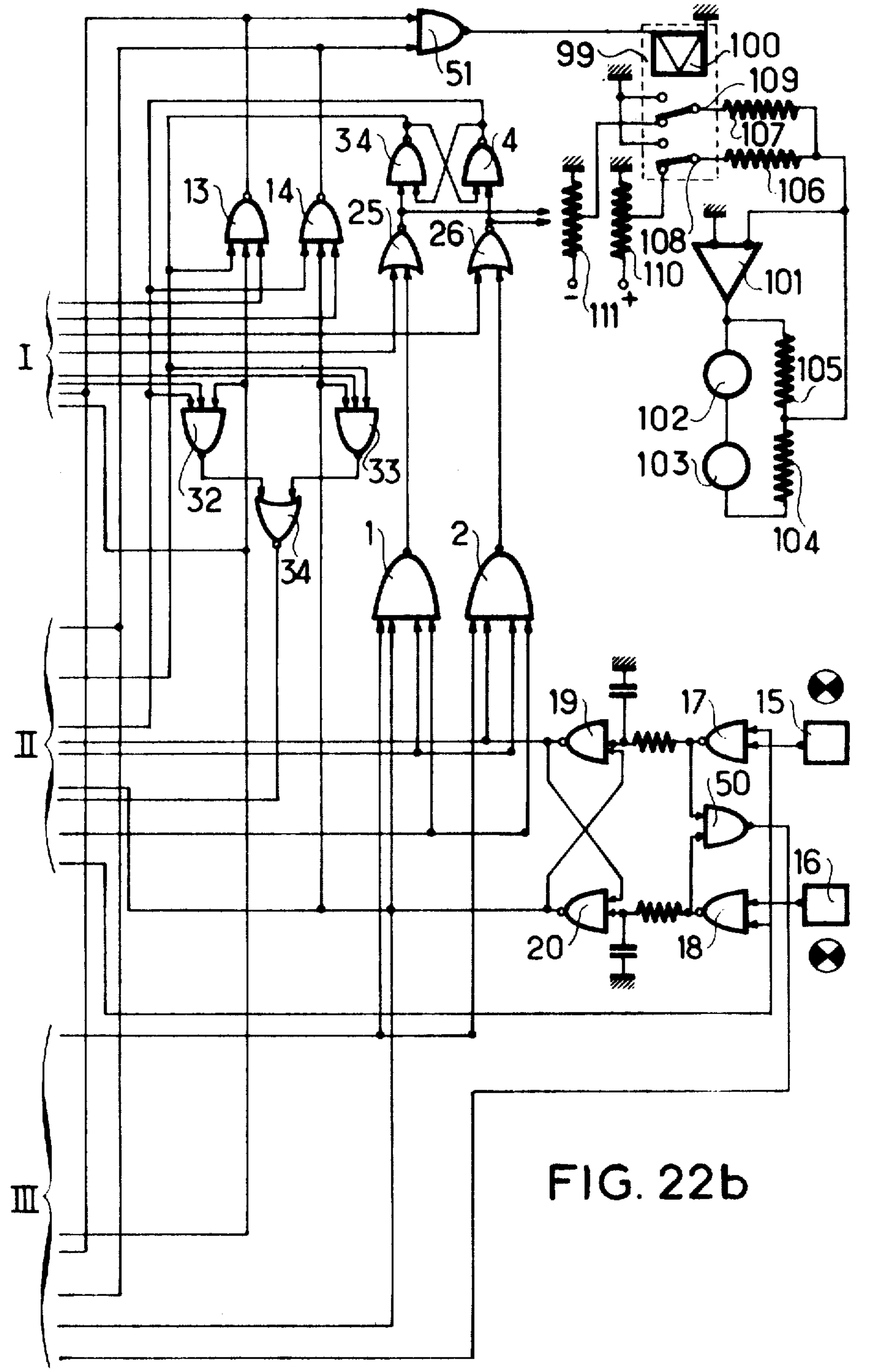

FIGS. 22*c*, 22*b*—FIGS. 22*a*, 22*b*, give an overall view of the complete logical circuitry, integrating the basic circuit and all the correction loops.

The connections between the two figures is made by the groups of connections I, II, III.

What I claim is:

1. A device for controlling a synchronous on-load switching apparatus for alternating current, said apparatus comprising two static switches (A,B), each formed by one or more controlled rectifiers ($T_{A1}$, $T_{A2}$, $T_{B2}$), protection elements having nonlinear resistances ($E_A$, $E_B$, $P_A$, $P_B$) connected in parallel with said controlled rectifiers, a device (S,210) for detecting the passage through zero of the load current, and a mechanical preselector (I, II, III, IV, V), the improvement comprising a logical control circuit having a sequence commencement order store (MC, 19, 20), a controlled rectifier extinction order store (MX, 34), and a controlled rectifier ignition order routing store (MG 78) for routing the order to ignition of the controlled rectifiers, said ignition order routing store comprising two complementary outputs, each connected to an AND circuit (9,10) controlling the ignition of one of the static switches, each of said AND circuits furthermore receiving an ignition signal ($I_4$) by the fact that the time separating the extinction order ($I_2$) from the sequence commencement order ($I_1$) is at least equal to the time at the end of which, after a passage through zero of the minimum load current, the static switches are no longer capable of being extinguished if their control current is suppressed, wherein, the routing signal ($I_3$) is distinct from the extinction signal ($I_2$) and is emitted after the latter, and wherein the ignition signal ($I_4$) is produced after the passage through zero of the load current only at the end of a time longer than the deionization time of the controlled rectifiers.

2. A device according to claim 1, further comprising a device (55, 68 to 92) supplying the different control signals cyclically, the sequence commencement signal being generated after the routing signal of the preceding signal only at the end of a time at least equal to the time necessary for the return to the initial state of the different elements of the logical control circuit.

3. A device according to claim 1, further comprising a device (52—65, 48) for detecting the passage through zero of the load current without change of sign, constituted essentially by three stores (58—59, 56—57, 60—61), each receiving respectively a signal emitted when the load current passes from a positive value to zero, a signal emitted when the load current passes from zero to a positive value, and a signal emitted when the load current passes from zero to a negative value, the output signal of the first two stores and the signal opposite to the output signal of the third store being sent to the input of an AND circuit (62), the aforesaid second signal controlling with a certain delay the return to zero of the three stores.

4. A device according to claim 1, further comprising a correction logical circuit (201) suppressing the transmission of the transmission order to the control circuit, and maintaining the routing store (MG) in its initial state when, during a sequence, the ignition signal ($I_4$) is produced before the routing signal ($I_3$).

5. A device according to claim 1, further comprising a first circuit (25,26) producing a signal for the extinction of one of the controlled switches, and a signal placing or maintaining the routing store (MG) in its initial state when the other controlled switch receives an ignition order.

6. A device according to claim 1, characterized in that it comprises a second circuit (21, 22, MA, 27 28, 29, 30, 31) supplying a signal when, during a sequence, the load current passes a second time through zero in a time less than the deionization time of the controlled switches, said signal, by means of a first anomaly store (MA), returning the routing store mg. to its initial state, and said first anomaly store (MA) being returned to zero by the sequence commencement signal ($I_1$).

7. A device according to claim 5, further comprising a third circuit (32, 33, 34, 35) supplying a blocking signal when the sequence commencement order store (MC) has registered a signal ($I_1$) of switching at one of the controlled switches, when the signal ($I_2$) has been emitted, and when the routing store (MG) has been placed in the position corresponding to the ignition of the switch considered, said blocking signal opposing the action of the logical correction circuit (201) and said first circuit.

8. A device according to claim 7, wherein the aforesaid blocking signal returns the first anomaly store (MA) to zero.

9. A device according to claim 6, further comprising two additional circuits (13,14) each supplying a verification signal when a sequence of switching from one controlled switch to the other has been effected correctly, said verification signal opposing the action of said second circuit.

10. A device according to claim 7, further comprising a fourth circuit (36) blocking the action of said third circuit after a passage to zero of the load current and during a time at least equal to deionization time of the controlled switches.

11. A device according to claim 3, further comprising a fifth circuit (41, 42, MA') comprising a second anomaly store (MA') receiving the output signal of said detecting device (52—65, 48) and returned to zero by the sequence commencement signal ($I_1$) supplied by the said circuit opposing the transmission of the sequence commencement signal ($I_1$) to sequence commencement order store (MC) and the transmission of the routing signal ($I_3$) to the routing store (MG).

12. A device according to claim 8, further comprising a sixth circuit (37, 38, 9', 10', 39, 40) supplying a signal to reignite the first controlled switch when the detecting device (52—65, 48) indicates a passage of the load current through zero without change of sign, when the order for the extinction of one of the controlled switches has been give and when the other controlled switch has not received the ignition order.

13. A device according to claim 1, wherein the sequence commencement signal ($I_1$) is sent to the sequence commencement order store mg. by means of an integrator circuit (R,C).

14. A device according to claim 9, wherein the mechanical preselector comprises a blocking device (99,100) activated by a signal produced by a circuit (51) when neither of the two additional circuits (13,14) supplies a verification signal.

15. A device according to claim 1 further comprising a number of protection elements having nonlinear resistance for each controlled switch, wherein some of said protection elements are connected in parallel with a switch and other of said protection elements are in parallel with the assembly of said controlled switch and the device (5,210) for the detection of the passage of the load current through zero.

16. A device according to claim 15, characterized in that the majority of the protection elements are in parallel with the set formed by said controlled switch and the device for the detection of the passage of the load current through zero.